US012604174B2

(12) United States Patent
Yang et al.

(10) Patent No.: US 12,604,174 B2
(45) Date of Patent: Apr. 14, 2026

(54) METHODS AND SYSTEMS FOR INTELLIGENT ROAMING USING RADIO ACCESS NETWORK INTELLIGENT CONTROLLERS

(71) Applicant: VMware LLC, Palo Alto, CA (US)

(72) Inventors: Yang Yang, Morris Plains, NJ (US);
Robert Soni, New Albany, OH (US);
Rittwik Jana, Montville, NJ (US);
Padma Sudarsan, Naperville, IL (US);
Islam El abbasy, San Francisco, CA
(US)

(73) Assignee: VMware LLC, Palo Alto, CA (US)

( * ) Notice: Subject to any disclaimer, the term of this patent is extended or adjusted under 35 U.S.C. 154(b) by 441 days.

(21) Appl. No.: 18/305,089

(22) Filed: Apr. 21, 2023

(65) Prior Publication Data

US 2024/0357339 A1    Oct. 24, 2024

(51) Int. Cl.
*H04W 8/08*        (2009.01)
(52) U.S. Cl.
CPC .................................... *H04W 8/08* (2013.01)
(58) Field of Classification Search
CPC ........... H04W 8/00; H04W 8/02; H04W 8/04;
H04W 8/06; H04W 8/08; H04W 24/10;
H04W 36/0022; H04W 36/00222; H04W
36/00224; H04W 36/0058; H04W
36/0066; H04W 36/0085; H04W 36/0088;
H04W 36/0094; H04W 36/30; H04W
36/302; H04W 36/304; H04W 36/38;
H04W 36/385
See application file for complete search history.

(56) References Cited

U.S. PATENT DOCUMENTS

2024/0323719 A1 *  9/2024  Corgan ................. H04W 24/06
2024/0389178 A1 * 11/2024  Zia ...................... H04W 40/026

* cited by examiner

*Primary Examiner* — Matthew W Genack
(74) *Attorney, Agent, or Firm* — Kim & Stewart LLP

(57)        ABSTRACT

This disclosure is directed to methods and system for intelligent roaming of user equipment ("UE") of a home network onto a visited network. The methods and systems monitor performance of voice and data services for UEs in coverage areas of edge cell sites of the home network. The methods and systems determine which UEs in the coverage areas of the edge cell sites to roam on the visited network based on decreases in voice and data services. The UEs in the coverage areas selected for roaming are pushed to roam on the visited network by sending a signal that instructs selected UEs to switch into roaming mode while the UEs are still in the coverage areas of the edge cell sites.

12 Claims, 19 Drawing Sheets

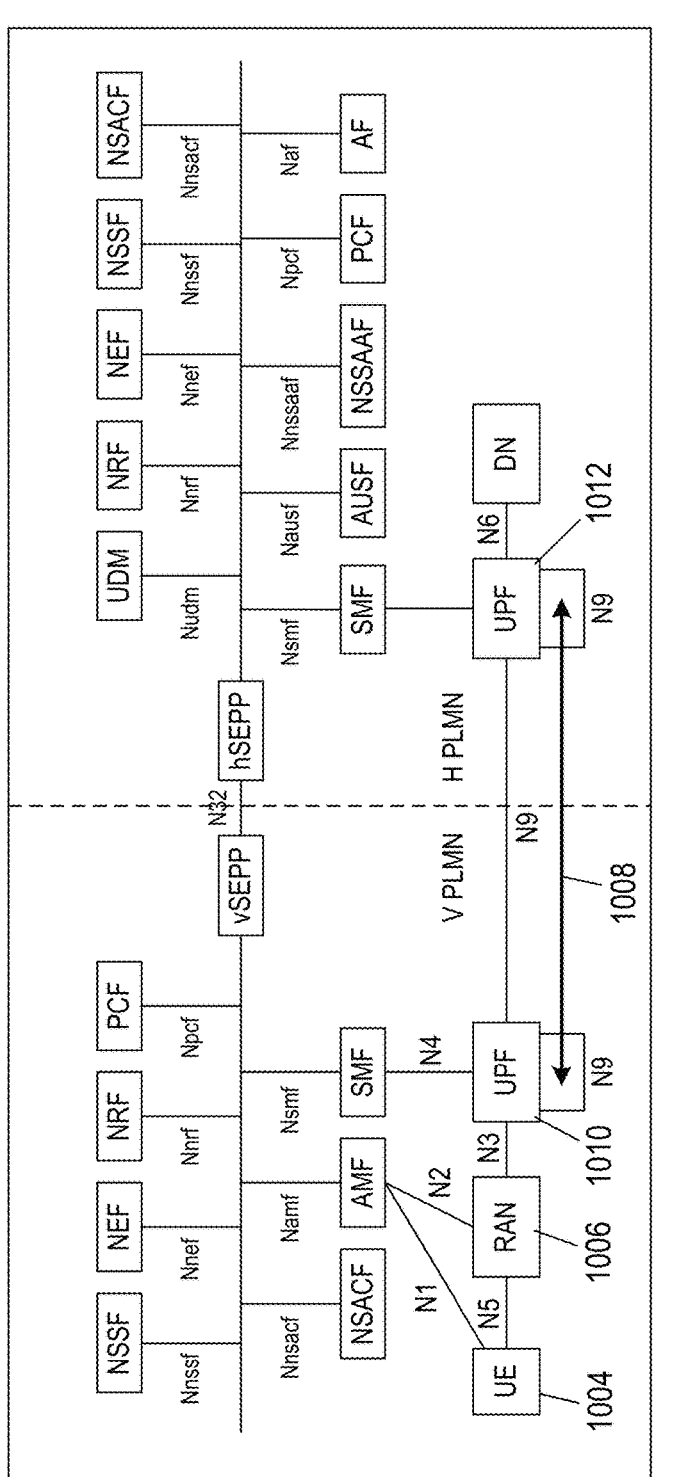

FIG. 10

NSSF = network slice selection function
NEF = network exposure function
NRF = network repository function
PCF = policy control function
AF = Automatic frequency control
AMF = access and mobility management function
SMF = session management function
NSACF = network slice admission control function
UE = user equipment
UPF = user plane function UDM = unified data managemet
NSSAAF = network slice specific authentication & authorization function
NSACF = network slice admission control function
AUSF = authentication server function
PLMN = public land mobile network
SEPP = security edge protection proxy
RAN = radio access network
UPF = user plane function
DN = destination network

METHODS AND SYSTEMS FOR INTELLIGENT ROAMING USING RADIO ACCESS NETWORK INTELLIGENT CONTROLLERS

TECHNICAL FIELD

The present disclosure is directed to telecommunications networks, and in particular, to methods and systems for intelligent roaming from a home telecommunications network to a visited telecommunications network.

BACKGROUND

Telecommunications networks have undergone significant changes over the years to keep pace with the ever-increasing demand for wireless data transmission. Each generation in telecommunication technology has provided higher data volumes and faster data transmission rates. Telecommunications networks began with first-generation network technology ("1G"), which supported analog voice communications. Second- and third-generation network technology ("2G" and "3G") supported digital voice communications with 3G data rates that reached 3 megabits per second ("Mbps"). The fourth-generation network technology ("4G") provided even faster broadband data rates of about 1 gigabit per second ("Gbps"), which expanded the types of user equipment ("UE") that can be connected to telecommunications networks from mobile phones to computers, automobiles, drones, industrial and agricultural machines, robots, home appliances, and internet of things ("IoTs") devices. Four-G expanded the user experience to include high-definition streaming and video game streaming and mobile internet browsing overtook desktop internet browsing. A fifth-generation telecommunication network technology ("5G") is expected to deliver still faster broadband data rates of up to about 20 Gbps.

Telecommunications networks are owned and maintained by wireless service providers ("WSPs"). Each WSP obtains a license to a particular band of the radio spectrum from a regulatory or government agency and sells mobile data subscription service contracts to end users ("subscribers") of their telecommunications networks. A typical telecommunications network that subscribers have access to under service contracts is called a "home network." The cell sites of a telecommunications network create geographical coverage areas in which subscribers can send and receive data. For example, a home network in the metropolitan area of a city is typically composed of numerous cell sites with overlapping coverage areas that create a large geographical coverage area, providing subscribers with ideally uninterrupted service while traveling in the metropolitan area. But farther out from the city center, cell sites of the home network are typically separated by longer distances, creating gaps between geographical coverage areas. A subscriber traveling outside the metropolitan area can expect service to gradually fade as the subscriber's UE approaches the edge of a coverage area and service to be dropped completely once the subscriber's UE enters a gap between coverage areas.

Roaming occurs when a subscriber's UE leaves the geographical coverage area of the subscriber's home network, fails to detect services on the home network, and is in the geographical coverage area of a telecommunications network of another WSP called a "visited network." To enable home network subscribers to receive voice and data services on the visited network, many WSPs have roaming agreements. A roaming agreement between the WSP of the home network and the WSP of the visited network enables subscribers of the home network to access their home network via the visited network. While a subscriber is roaming on a visited network, data output from the subscriber's UE is routed through the visited network to the home network and incoming data is routed via the home network to the visited network before reaching the subscriber's UE.

New and small WSPs typically have small coverage areas that primarily cover populated regions of cities and have fragmented radio spectra. Moreover, although the purpose of roaming is to provide a user with continuous service outside of their home network, as explained above, roaming on a visited network happens only when a subscriber's UE detects no service in the home network. These limitations create poor experiences for subscribers of new and small WSPs. For example, when a subscriber is located near the edge of a coverage area of their home network data transmission is often intermittent and unreliable, which creates a frustrating experience for the subscriber. However, the subscriber does not roam to a visited network of another WSP that has a roaming agreement with the WSP of the subscriber's home network even if the subscriber's UE can potentially get continuous and more reliable service on the visited network. In addition, a subscriber experiencing intermittent and unreliable data transmission in their home network creates a drain on resources of the home network because the same data often must be repeatedly transmitted to the subscriber's UE to complete a request for data. Those in the telecommunications industry seek methods and systems that improve data transmission as subscribers reach the edge of coverage areas of their home networks.

SUMMARY

This disclosure is directed to methods and system for intelligent roaming of user equipment ("UE") of a home network onto a visited network. The methods and systems monitor performance of voice and data services for UEs in coverage areas of edge cell sites of the home network. The methods and systems determine UEs in the coverage areas of the edge cell sites for roaming on the visited network based on decreases in performance of voice and data services. The UEs experiencing decreases in performance are pushed to roam on the visited network by sending a signal that instructs selected UEs to switch into roaming mode while the UEs are still in the coverage areas of the edge cell sites. As a result, the UEs that are pushed into roaming mode experience a seamless transition in coverage from the home network to the visited network. This seamless transition has a significant advantage over the traditional practice of only switching into roaming mode when the carrier signal of the home network drops to zero, which causes dropped voice calls and data services.

DESCRIPTION OF THE DRAWINGS

FIG. 10 shows a system architecture for home routed voice and data in accordance with the third-generation partnership project ("3GPP").

DETAILED DESCRIPTION

This disclosure is directed to methods and systems for intelligent roaming of UEs of a home network onto a visited network using radio access network intelligent controllers of the home network and the visited network. Telecommunication networks are described in a first subsection. Methods and systems for intelligent roaming in multi-operator telecommunications networks are described in a second subsection.

Telecommunications Networks

Figure 1:
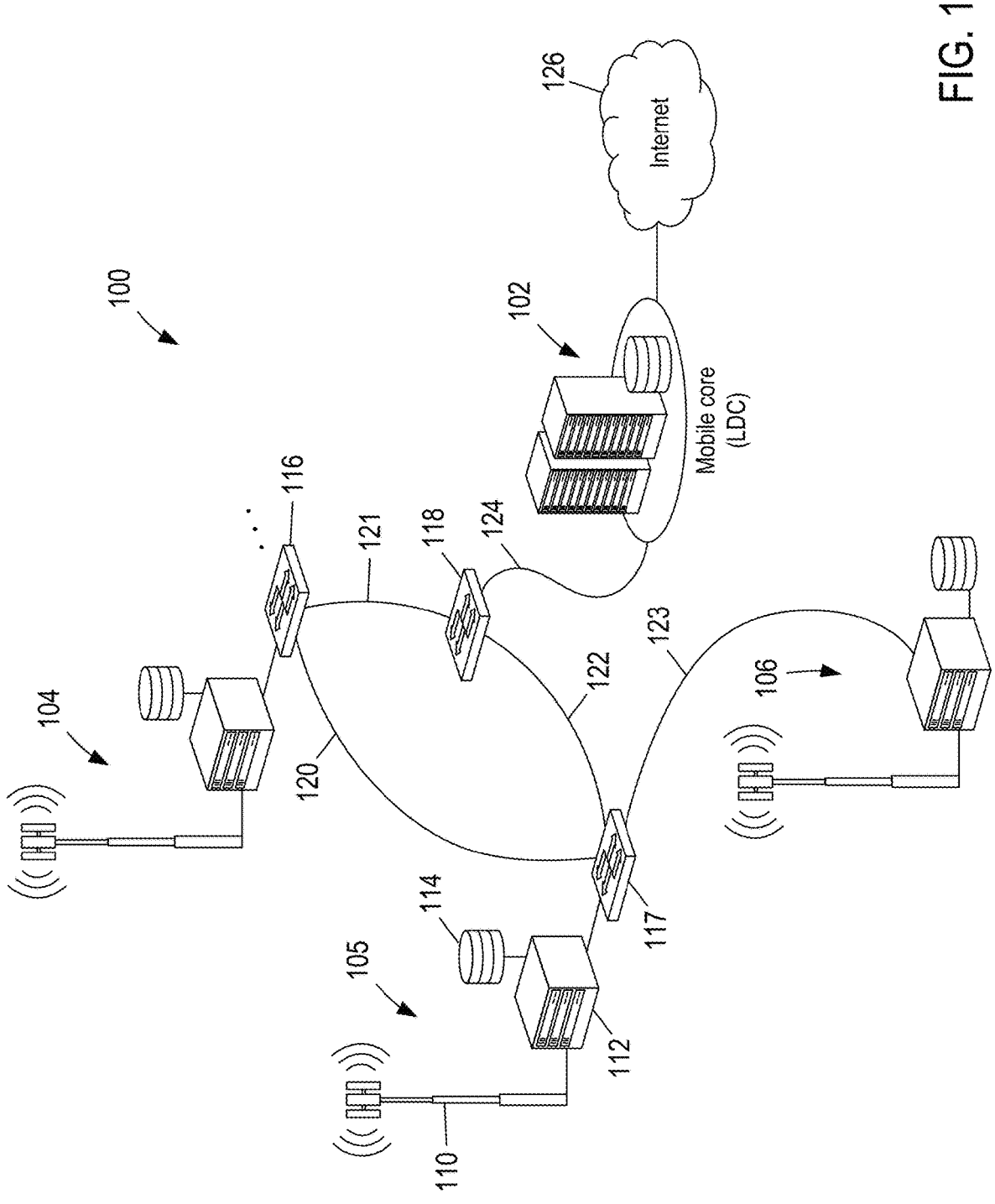
FIG. 1 shows an example of cell sites and a mobile core of a telecommunications ("telecom") network.

A telecommunications ("telecom") network is composed two primary subsystems: a radio access network ("RAN") and a mobile core connected to the Internet. FIG. 1 shows an example of a telecom network 100. The telecom network 100 includes a mobile core 102 and a RAN composed cell sites, such as example cell sites 104-106. In practice, a RAN can be composed of dozens or even hundreds of cell sites as represented by ellipsis 108. Each cell site includes at least one antenna, one or more computer systems, and a data storage appliance. For example, cell site 105 includes an antenna 110 located on a tower, computer system 112, and a data storage appliance 114. The mobile core 102 is the center of the telecom network 100. The telecom network 100 includes a backhaul network that comprises the intermediate links, such as cables, optical fibers, and switches, and connects the mobile core 102 to the cell sites of the RAN. In the example of FIG. 1, the backhaul network includes switches 116-118 and intermediate links 120-124. In one implementation, the intermediate links can be optical fibers. In other implementations, the backhaul network may be implemented with wireless communications between cells sites and the mobile core 102. The mobile core 102 provides a bridge between the RAN in a geographic area and a larger IP-based Internet 126.

Figure 2:
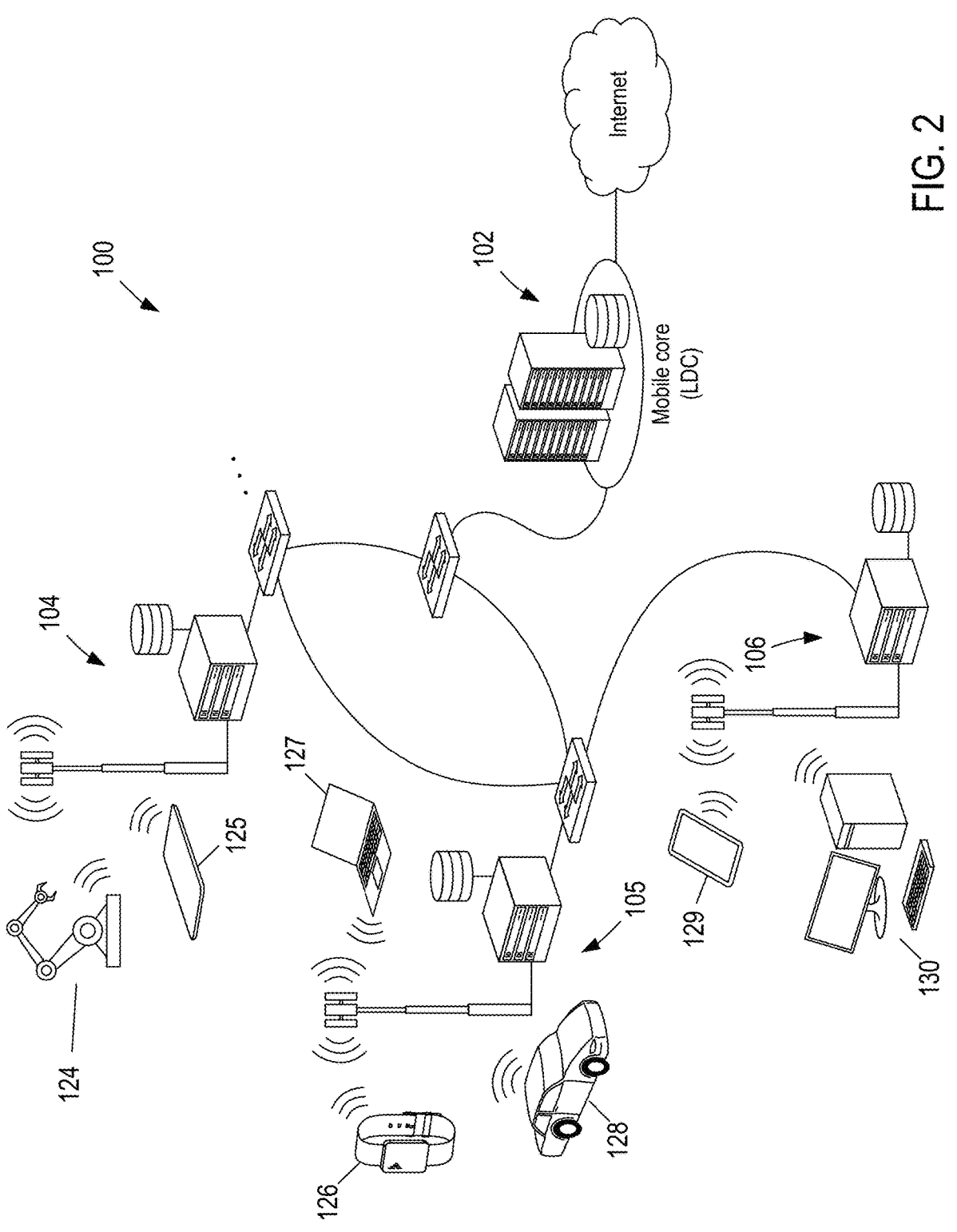
FIG. 2 shows a telecom network with wireless connectivity to user equipment ("UE").

FIG. 2 shows the telecom network 100 with wireless connectivity to user equipment ("UE"). UEs include mobile phones, computers, automobiles, drones, industrial and agricultural machines, robots, home appliances, and IoT devices. FIG. 1 shows examples of UEs, such a robot 124, a tablet 125, a watch 126, a laptop 127, an automobile 128, a mobile phone 129, and a computer 130. The mobile core 102 is implemented in a local data center ("LDC") that provides a bundle of services. For example, the mobile core 102 provides (1) internet connectivity for both data and voice services; (2) ensures the connectivity satisfies quality-of-service ("QoS") requirements; (3) tracks UE mobility to ensure uninterrupted service as subscribers travel within the coverage area; and (4) tracks subscriber usage for billing and charging.

The computer systems at each cell site run management services that maintain the radio spectrum used by the UEs, make sure the cell site is used efficiently and meets QoS requirements of the UEs that communicate with the cell site. The functions performed by the cell sites and the mobile core 102 are partitioned in management planes, control planes, and user planes.

Figure 3:
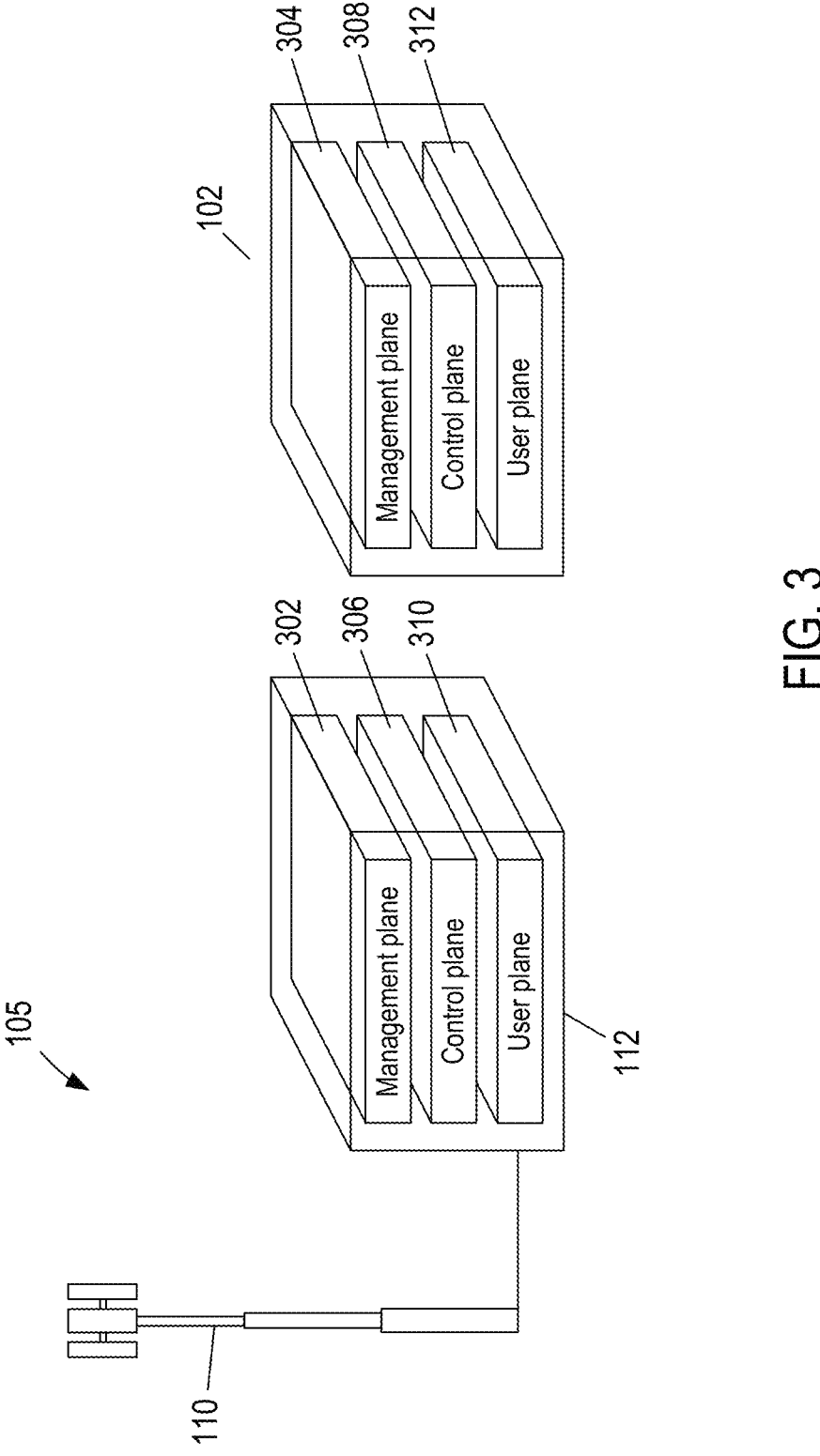
FIG. 3 shows an example of management, control, and user planes of a cell site and a mobile core of a telecom network.

FIG. 3 shows an example of management, control, and user planes of the cell site 105 and the mobile core 102. The cell site includes computer system 112 and an antenna 110. As shown in FIG. 3, the functions performed by the computer system 112 and the mobile core 102 are carried out in management planes, control planes, and user planes. The planes are abstracted to represent functions performed by the computer system 112 and the mobile core 102. The management plane 302 of the cell site 105 and the management plane 304 the mobile core 102 configure, monitor, and provide management, monitoring, and configuration services to all layers of the network. The management planes 302 and 304 carry the administrative traffic, which includes configuration and control commands for the RAN and mobile core functions. The user plane 306 of the cell site 105 and the user plane 308 of the mobile core 102 are protocol stacks that consists of sub-layers, such as packet data convergence protocol ("PDCP"), radio link control ("RLC"), and medium access control ("MAC"), carry user voice and multimedia traffic between the UEs and the Internet. The control planes 306 and 308 include a radio resource control ("RCC") layer that is responsible for configuring the user plane 310 of the cell site 105 and the user plane 312 of the mobile core 102 to control how data packets are sent between the UEs and the Internet. For example, the control plane 310 controls how data is forwarded from UEs to the mobile core 102 and controls handing over of the UEs to neighboring cell sites as discussed below with reference to FIG. 6. The control plane 312 controls how data is forwarded from the mobile core 102 to the cell site 105 and to the Internet The management plane, control plane, and user plane functionalities performed at the cells cites and the mobile core 102 are implemented in distributed applications with application components that are run in virtual machines ("VMs") or in containers that run on computer systems located at the cell sites and the mobile core 102. A VM is a computing resource that uses software instead of a physical computer to run programs and applications. Each VMs runs at least one application or program on its own operating system ("guest OS") and functions separately from other VMs running on the same computer system. A container, on the other hand, is an abstraction at the application layer that packages code and dependencies together. Multiple containers can run on the same computer system and share the operating system kernel, each running as an isolated process in the user space. One or more containers run in pods. The containers are isolated from one another and bundle their own software, libraries, and configuration files within pods.

Figure 4A:
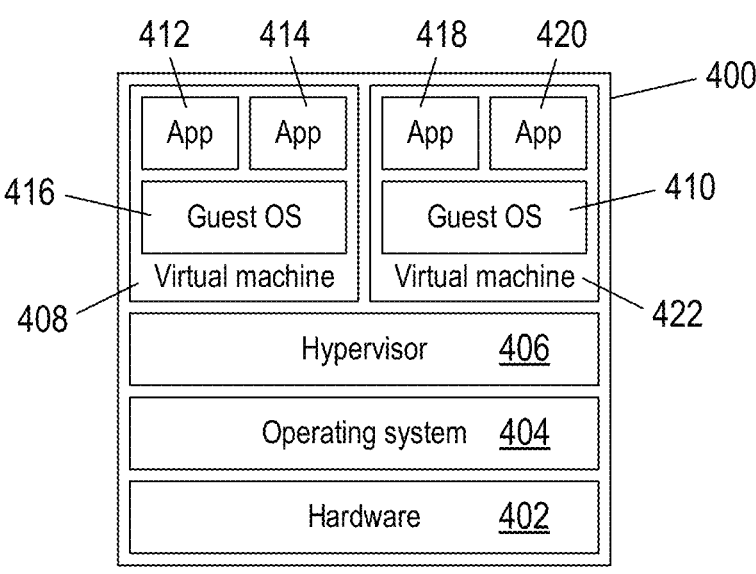
FIG. 4A shows an example of a virtual machine ("VM") execution environment of a cell site or a mobile core run on a computer system.

FIG. 4A shows an example of a VM execution environment of a cell site or a mobile core run on a computer system 400. The computer system 400 includes a hardware layer 402 composed of processors, memory, storage, and telecom devices, such as at least one high speed network interface card. The computer system 400 includes an operating system layer 404 that manages computer hardware, software resources, and provides services for computer programs executing on the computer system 400. VMs 408 and 410 execute on a hypervisor 406, such as an ESX® hypervisor or an ESXi® hypervisor by VMware Inc. The hypervisor 406 creates and runs the VMs 408 and 410 and allocates and abstracts resources of the hardware layer 402, such as CPU, memory, storage, and network access, to the VMs 408 and 410. VM 408 runs two applications 412 and 414 on a guest OS 416. VM 410 runs two application 418 and 420 on a guest OS 422. The guest OSs 416 and 422 can be different and can be different from the operating system 404 of the computer system.

Figure 4B:
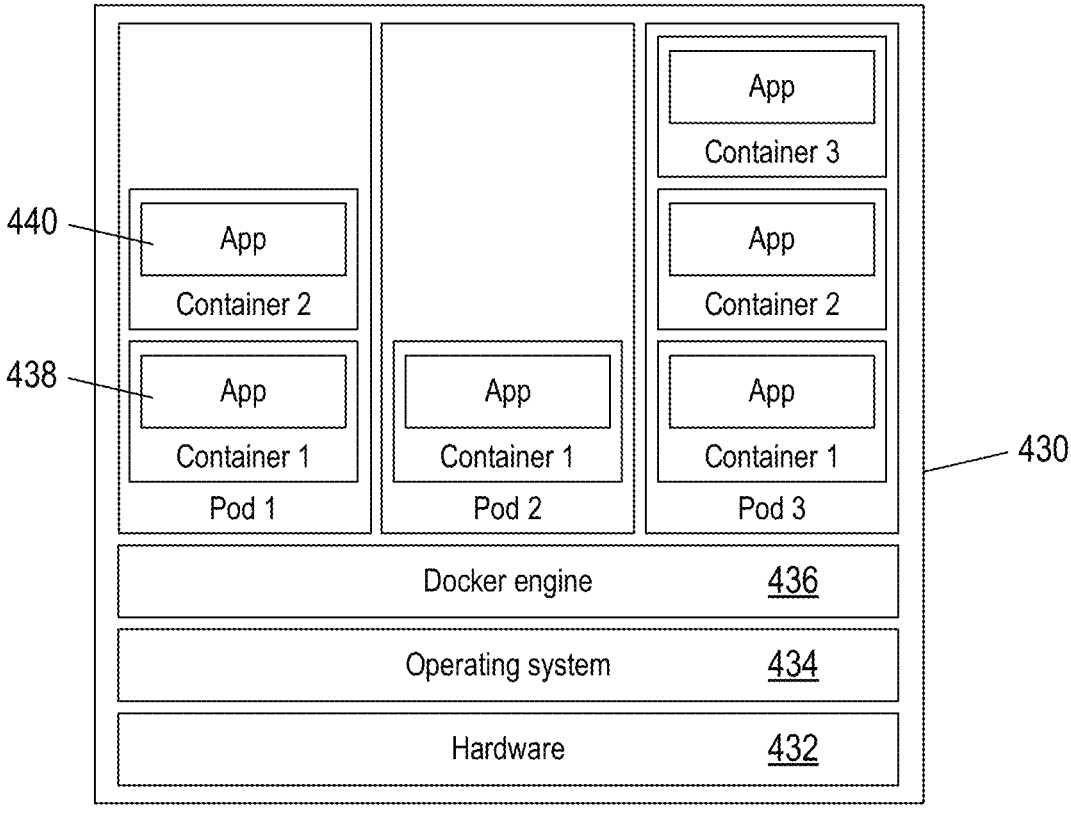
FIG. 4B shows an example of a container execution environment of a cell site or a mobile core run on a computer system.

FIG. 4B shows an example of a container execution environment of a cell site or a mobile core run on a computer system 430. The computer system 430 includes a hardware layer 432 composed of processors, memory, storage, and telecom devices, such as at least one high speed network interface card. The computer system 430 includes an operating system layer 434 that manages computer hardware, software resources, and provides services for computer programs executing on the computer system. Docker engine 436 is a server application for containerizing applications. In this example, applications are run separately in containers that are in turn run in pods identified as Pod 1, Pod 2, and Pod 3. Each pod runs one or more containers with shared storage and network resources, according to a specification for how to run the containers. For example, Pod 1 runs an application 438 in a container identified as container 1 and another application 440 in a container identified as container 2. An application running in a pod is a workload and the computer system, such as the computer system 430, with applications running in containers of pods is called a "worker node."

Wireless service providers ("WSPs") typically own and maintain telecom networks. Each WSP obtains a license to a particular band of the radio spectrum from a regulatory or government agency and sells mobile data subscription service contracts to end users ("subscribers"). The telecom network that subscribers have access to under service contracts is called a "home network." The home network establishes separate wireless channels within the allotted radio spectrum between with UEs of the subscribers and cell sites of the home network. Each channel is modulated on a carrier signal (i.e., signal) of a different radio frequency ("RF") of the radio spectrum. In other words, for each subscriber of a WSP, whenever a signal of a UE of a subscriber of the WSP is detected by an antenna of a cell site of the home network, the home network creates a wireless channel between the UE and the cell site. Data is sent between the UE and the cell site via this wireless channel.

Figure 5:
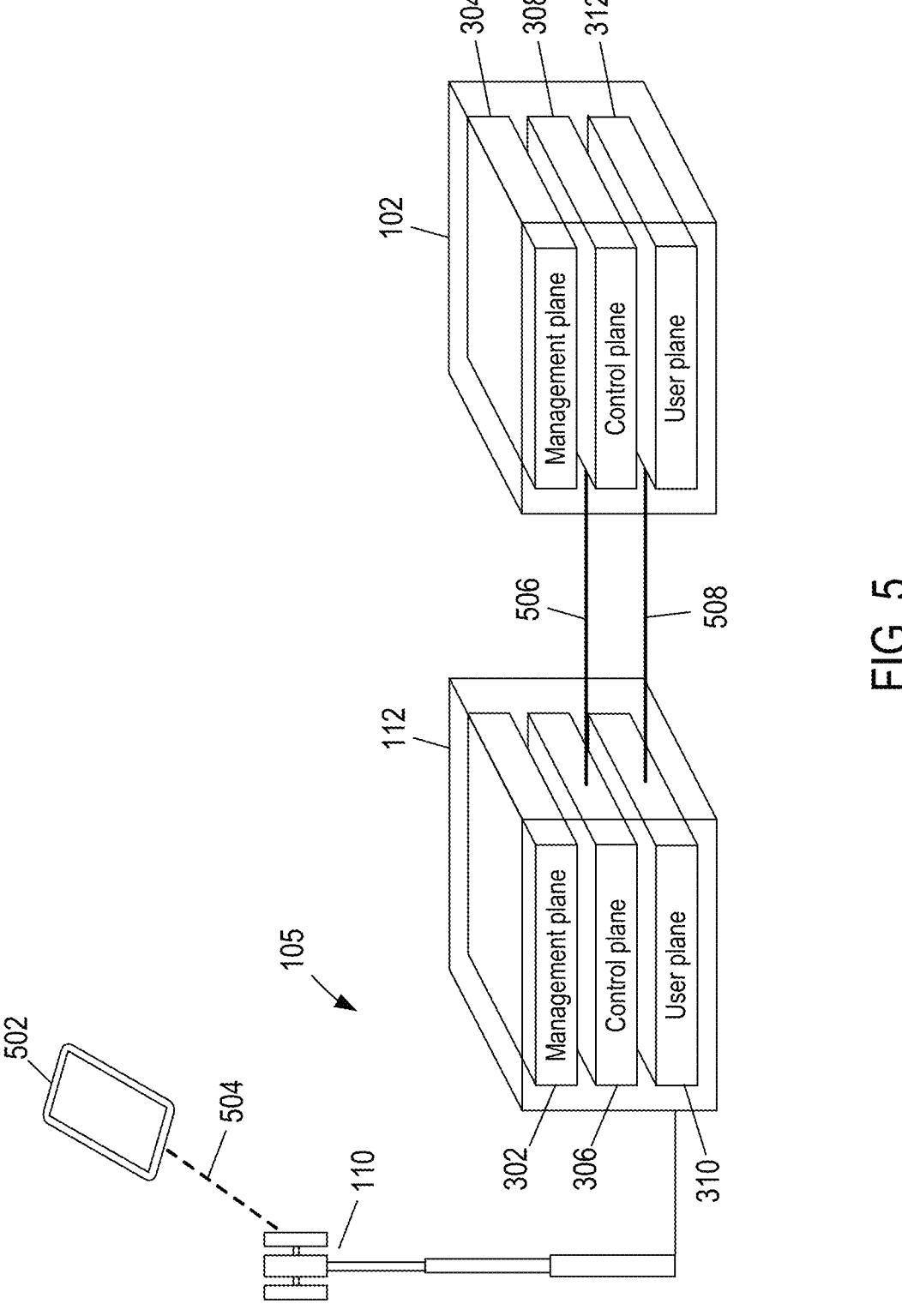
FIG. 5 shows a wireless channel created between a UE, a cell site, and a mobile core of a telecom network.

FIG. 5 shows how a wireless channel is created between a UE 502, the cell site 105, and the mobile core 102 of the telecom network 100. The UE 502 belongs to a subscriber of the WSP that owns and maintains the telecom network 100. In other words, the telecom network 100 is the home network of the subscriber. The cell site 105 detects a signal output from the UE 502 when the UE 502 is powered up or when the signal produced by the UE 502 is close enough to be detected by the antenna 110. The control plane 306 establishes a wireless channel, represented by dashed line 504, with the UE 502, via the user plane 310. The wireless channel 504 is released when the UE 502 is idle for a predetermined period of time, powered off, or handed over to a neighboring cell site as described below with reference to FIG. 6. The control plane 306 receives signaling traffic from the UE 502. The signaling traffic enables authentication, registration, and mobility tracking of the UE 502. For example, the signaling traffic may include information contained in a SIM card of the UE 502, such as the international mobile subscriber identity ("IMSI"). The IMSI contains the mobile country code ("MCC") and the mobile network code ("MNC") as prefixes, which are used for identifying the carrier network of the SIM card. In addition, the IMSI includes the mobile subscription identification number ("MSIN") used to identify a user account within the carrier network. The control plane 306 of the cell site 105 establishes connectivity represented by line 506 between the UE 502 and the control plane 308 of the mobile core 102 and forwards signaling traffic from the UE 502 to the control plane 308. The control plane 308 decides whether to authorize the UE 502 based on the signaling traffic. Once the authentication procedure is completed in the control plane 308, a set of dedicated transmission channels represented by line 508 are established between the user plane 310 and the user plane 312. Transmission channels 508 carries voice traffic between the UE 502 and the user plane 312 and multimedia traffic between the UE 502 and the user plane 312.

Home network handover is the process of transferring an ongoing call or data transmission from a wireless channel of a cell site connected to a mobile core to another wireless channel of a different cell site connected to the same mobile core without loss or interrupting in service. Each cell site coordinates UE handovers with neighboring cell sites of the same home network, using direct cell-site-to-cell-site links. When a call or data transmission is in a state of handover, the wireless channel with the strongest signal is used for the call or data transmission at a given moment or the parallel signals are combined at the mobile core 102 to produce a clearer copy of the signal.

Figure 6:
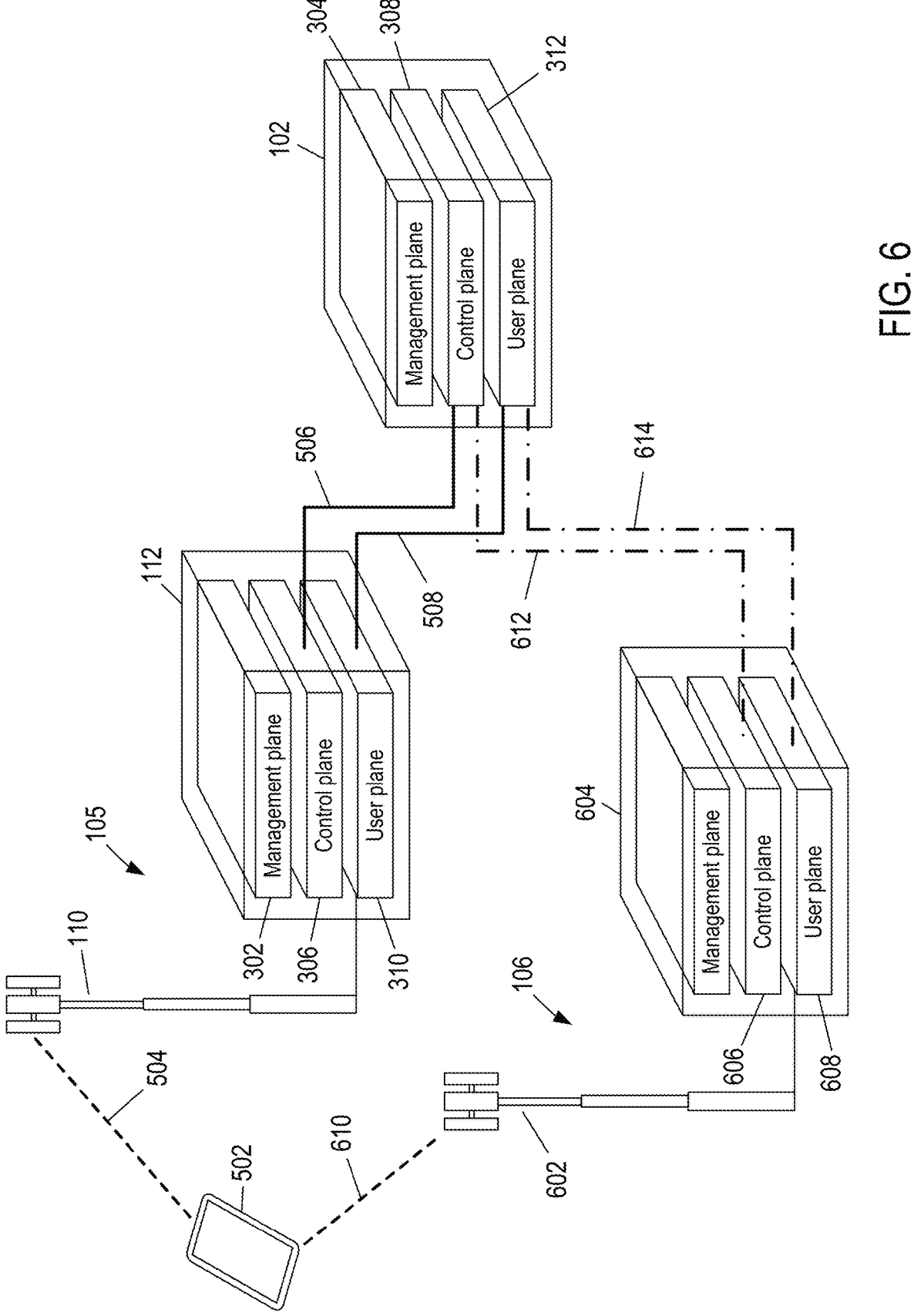
FIG. 6 shows an example of home network handover without data loss or interruption in service.

FIG. 6 shows an example of home network handover of the UE 502 from the cell site 105 to the neighboring cell site 106 without data loss or interruption in service. In this example, the UE 502 is originally in voice or data transmission with the cell site 105 as described above with reference to FIG. 5. As the UE 502 moves closer to the cell site 106, the antenna 602 of the cell site 106 detects the signal from the UE 502. The cell site 106 includes a computer system 604 connected to the antenna 602. The control plane 606 of the computer system 604 establishes a wireless channel 610 with the UE 502 via the user plane 608. As a result, the UE 502 has two simultaneous parallel wireless channels 504 and 610 with the cell sites 105 and 106, respectively. The control plane 606 of the cell site 106 establishes connectivity with the control plane 308 of the mobile core 102 as represented by dot-dashed line 612 and forwards signaling traffic from the UE 502 to the control plane 308. The control plane 308 decides whether to authorize the UE 502 based on the signaling traffic. Once the authentication procedure is complete in the control plane 308, voice and data transmission channels represented by dot-dashed line 614 are established between the user plane 608 and the user plane 312. As a result, voice and data transmission continue uninterrupted. As the UE 502 moves farther away from the cell site 105 and closer to the cell site 106, the signal strength in the wireless channel 504 decreases while the signal strength in the wireless channel 610 increases causing the control plane 308 to sever the wireless channel 504 with the cell site 105. Once the wireless channel 504 is severed, the control plane 306 disconnects the UE 502 from the cell site 105.

Figure 7:
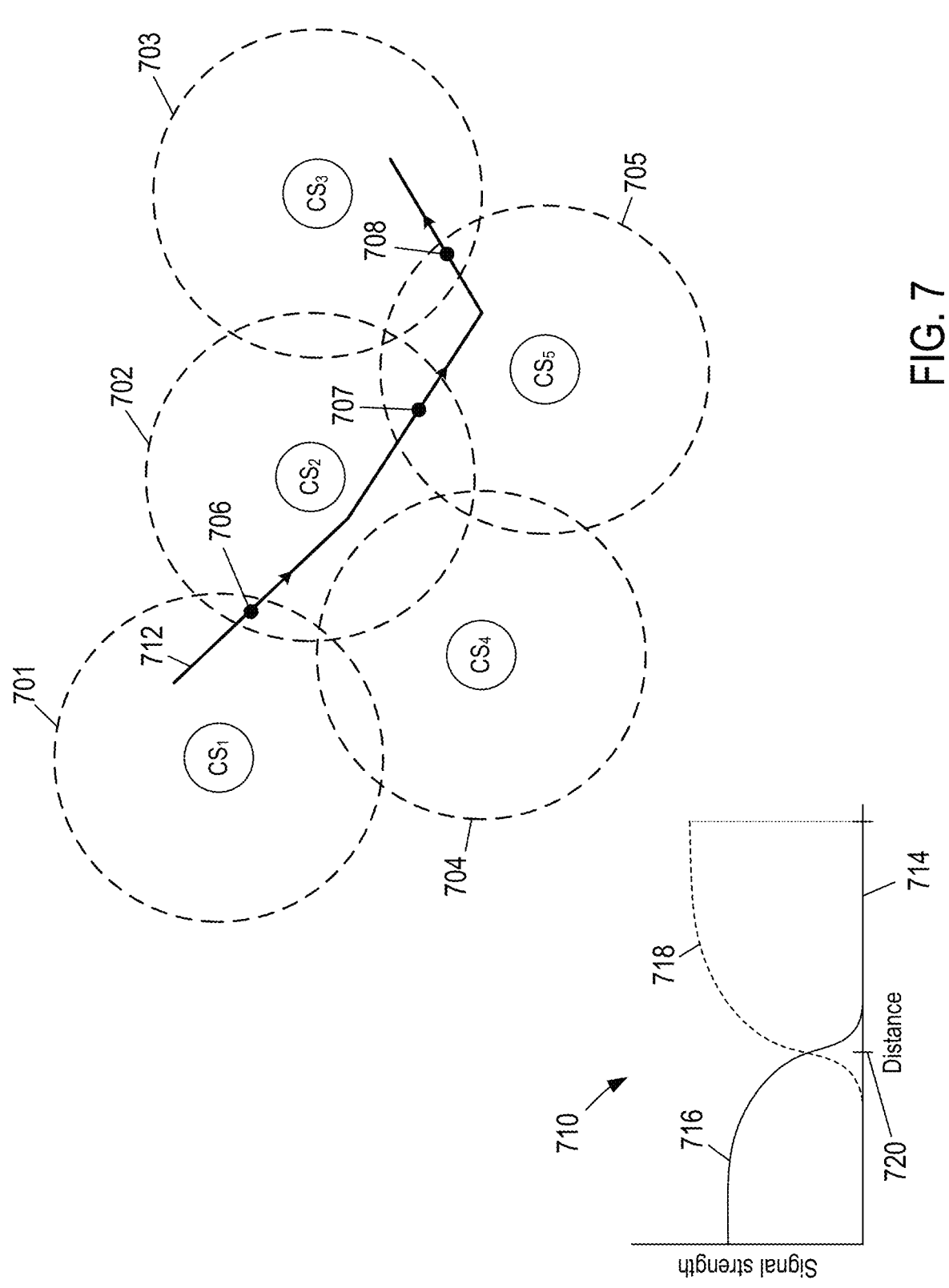
FIG. 7 shows a plan view of home network handover of a UE traveling within coverage areas of cells sites in a home network.

FIG. 7 shows a plan view of handover of a UE as the UE travels within overlapping coverage areas of cells sites in a RAN. In FIG. 7, five cell sites are represented by circles labeled by $CS_1$, $CS_2$, $CS_3$, $CS_4$, and $CS_5$. Dashed circles 701-705 centered on the cell sites identify the boundaries of coverage areas of the cell sites. Solid line segments represent a path of a UE travels within the coverage areas of the cell sites $CS_1$, $CS_2$, $CS_5$, and $CS_3$. Solid points 706-708 represents points along the path in which the UE is handed off from one cell site to another cell site. For example, plot 710 shows signal strengths of cell sites $CS_1$ and $CS_2$ along the segment 712 of the path. Horizontal axis 714 represents distance along the segment 712. Solid curve 716 represents the signal strength of the cell site $CS_1$ at the UE within the coverage area of the cell site $CS_1$. Dashed curve 718 represents the signal strength of the cell site $CS_2$ at the UE within the coverage area of the cell site $CS_2$. Mark 720 along the axis 714 corresponds to the point 706 where the UE is handed over from the cell site $CS_1$ to the cell site $CS_2$ without interruption in voice or data transmission as described above with reference to FIG. 6.

Methods and System for Intelligent Roaming in Multi-Operator Telecommunications Networks Many WSPs form roaming agreements so that when subscribers leave the RAN of their home network the subscribers can connect to the RAN of another WSP called a "visited network." A roaming agreement between the WSP of the home network and the WSP of the visited network enable subscribers of the home network to access voice and data service of their home network via the visited network or enable direct access to voice and data via the visited network. In the following discussion, the WSP that owns and maintains the home network is denoted by "WSP-H" and the RAN of the home network is denoted by "RAN-H." The WSP that owns and maintains the visited network is denoted by "WSP-V" and the RAN of the visited network is denoted by "RAN-V."

Figure 8:
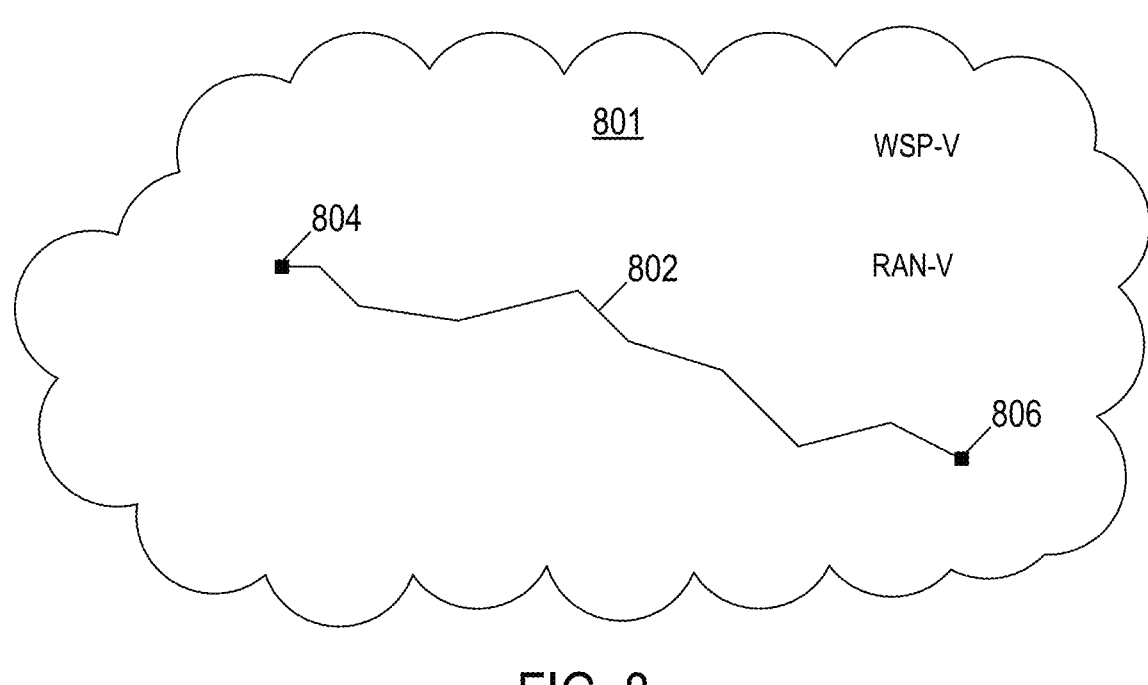
FIG. 8 shows a geographical coverage area of a radio access network ("RAN").

FIG. 8 shows an example geographical coverage area 800 of a RAN-V. Subscribers of voice and data services provided by WSP-V receive uninterrupted voice and data services while traveling within the geographical coverage area 800. FIG. 8 shows an example path 802 uninterrupted voice and data services traveled by a subscriber of WSP-V between the locations 804 and 806.

Figure 9:
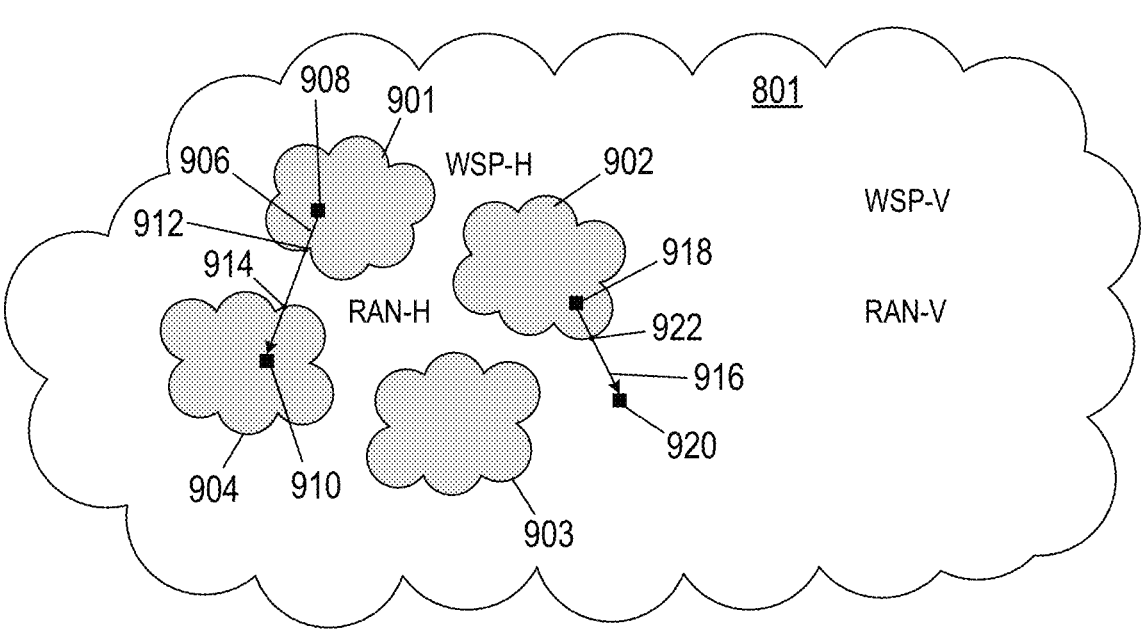
FIG. 9 shows an example RAN composed of separate geographical coverage areas within the geographical coverage area of the RAN in FIG. 8.

FIG. 9 shows geographical coverage areas 901-904 of a RAN-H. Subscribers of voice and data services provided by WSP-H receive uninterrupted voice and data services while traveling within each of the separate geographical coverage areas 901-904. In the following discussion, RAN-V is a visited network when WSP-H subscribers are located outside of the geographical coverage areas 901-904 of the RAN-H and are within the RAN-V geographical coverage area 801. When WSP-H subscribers leave the coverage areas 901-904 of RAN-H and roam on RAN-V, a roaming agreement between WSP-V and WSP-H enables WSP-H subscribers to access to voice and data services of the home network via the visited network or enables WSP-H subscribers direct access to voice and data services via the RAN-V. For example, directional arrow 906 represents the path of a first WSP-H subscriber that travels from a location 908 in coverage area 901 to a location 910 in coverage area 904. Points 912 and 914 mark edges of coverage areas 901 and 904 along the path 906. When the first subscriber's UE is located along the path 906 between the points 912 and 914, voice and data services of WSP-H are dropped and the first subscriber's UE roams on RAN-V. Directional arrow 916 represents the path of a second WSP-H subscriber that travels from a location 918 in coverage area 902 to a location 920 in coverage area 801. Point 922 marks the edge of coverage area 902 along the path 916. When the second subscriber's UE is located along the path 916 past the point 922, voice and data services of WSP-H are dropped and the second subscriber's UE roams on RAN-V. While the first and second subscribers roam on RAN-V, data output from the first and second subscribers' UEs is routed through RAN-V to the RAN-H and incoming data to the subscribers' UEs is routed via RAN-H to RAN-V before reaching the subscribers' UEs.

FIG. 10 shows a system architecture for home routed voice and data as described above with reference to FIG. 9 in accordance with the third generation partnership project ("3GPP"). FIG. 10 includes a legend 1002 of telecom abbreviations and acronyms used to represent the components of the visited network, denoted by V PLMN, and the home network, denoted by H PLMN. A UE 1004 of a subscriber of the home network has a wireless connection with the RAN 1006 of the visited network. Directional arrow 1008 represents routing voice and data between the UPF 1010 of the visited network and the UPF 1012 of the home network. Home routed voice and data requires more bandwidth and creates latency for roamers but allows the home network and the visited network to control roaming services, policy, and charging of the subscribers. Home routed voice and data is preferred when the WSP of the visited network is not reliable enough to service traffic of the home network subscribers.

An alternative to home routed voice and data services described above with reference to FIG. 10 is local breakout. Local breakout enables the WSP of the visited network to break out internet sessions into the home network, to provide inbound roamers with an ability to get data provided directly through the visited network. Local breakout enables roamers on a visited network to receive data services directly from the visited network instead of routing voice and data back to the home network. Local breakout is preferred when there is a trusted relationship between the WSPs of the home network and the visited network.

Figure 11:
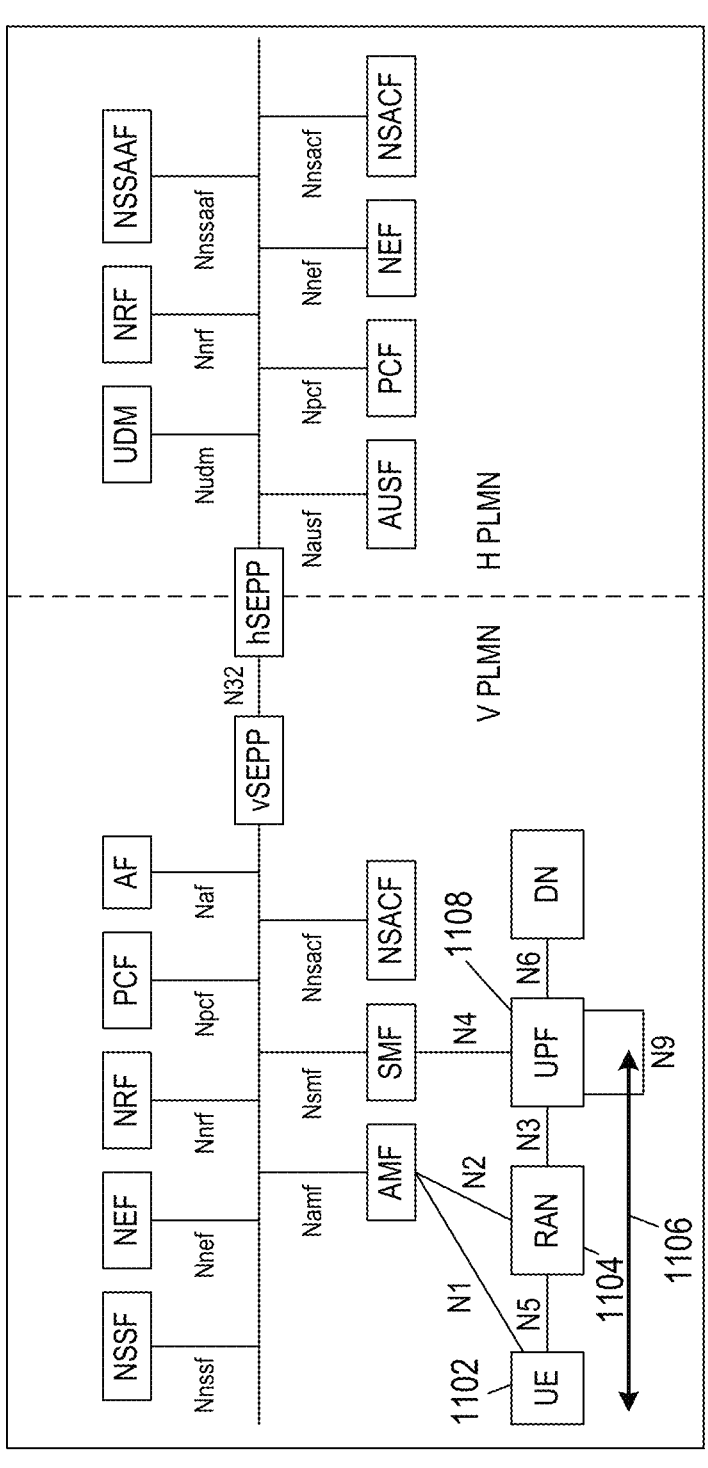
FIG. 11 shows a system architecture for local breakout of voice and data in accordance with the 3GPP.

FIG. 11 shows a system architecture for local breakout of voice and data in accordance with the 3GPP. A UE 1102 of a subscriber of the home network has a wireless connection with the RAN 1104 of the visited network. Directional arrow

1106 represents routing voice and data between the UE 1102 and the UPF 1108 of the visited network. Local breakout requires less bandwidth and has shorter latency than the home routed architecture shown in FIG. 10 because voice and data of the UE 1102 is routed through the UPF 1108 of the visited network and not routed from the UPF 1010 of the visited network and the UPF 1012 of the home network.

Roaming is intended to provide subscribers of WSPs uninterrupted voice and data services on visited networks when the subscribers are outside of the geographical coverage areas of their respective home networks. However, as currently practiced, conventional roaming on a visited network happens only when a UE of a subscriber no longer detects voice or data services in their respective home networks. This conventional practice of requiring voice and data services to longer be available with their home network before roaming services begin with a visited network has a significant drawback in that voice and data services of a home network typically become weak and intermittent (i.e., sparce coverage) as an UE approaches the edge of a home network and the UE does not roam on the visited network even though the signal of the visited network is much stronger and more reliable than that of the home network.

Figure 12A:
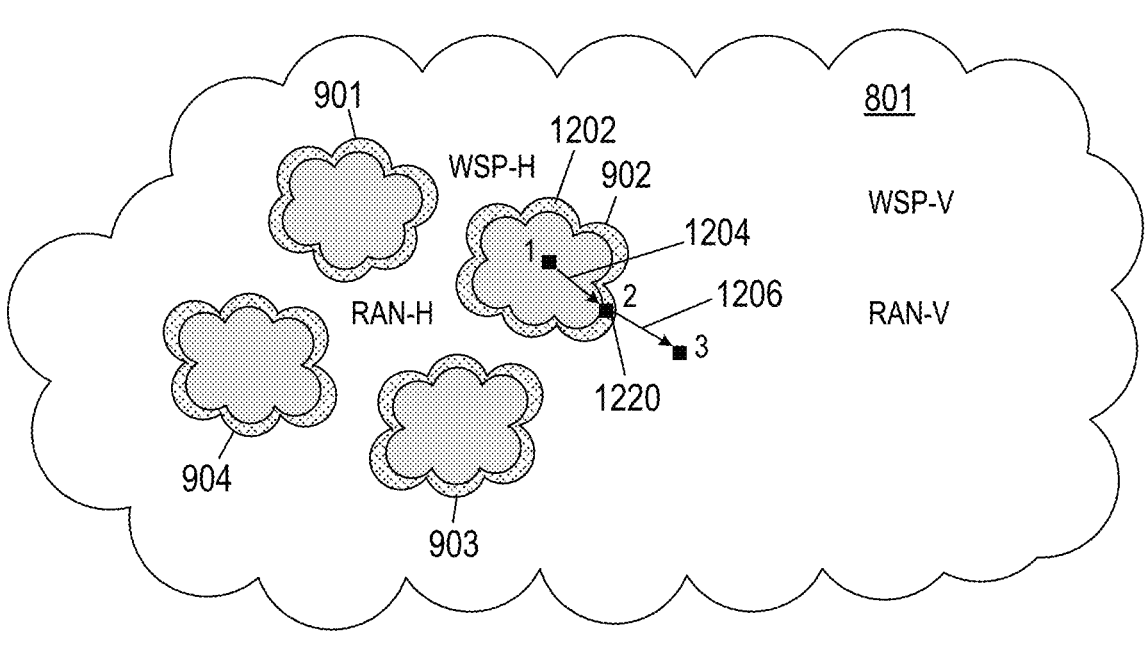
FIGS. 12A-12B show an example of changes in voice and data services along a path from a home network to visited network.
Figure 12B:
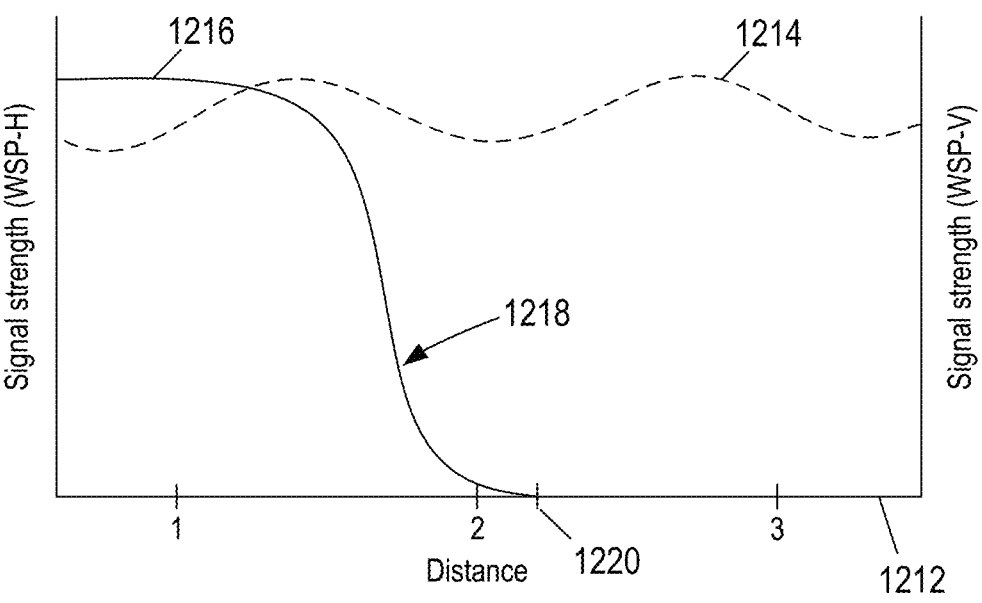

FIGS. 12A-12B show an example of how voice and data services of WSP-H become weak and intermittent as a UE of a WSP-H subscriber approaches the edge of RAN-H. In FIG. 12A, sparce coverage regions where voice and data coverage for UEs of WSP-H subscribers is sparse are identified by shaded areas near the edges of the coverage areas 901-904. For example, shaded area 1202 represents a sparce coverage region of the coverage area 902 where voice and data coverage for UEs of WSP-H subscribers is sparse (i.e., weak and intermittent signal). Square dots labeled 1, 2, and 3 correspond to locations along a path identified by directional arrows 1204 and 1206 traveled by a UE of a WSP-H subscriber. Location 1 is within the coverage area 902. Location 2 is located near the edge of the coverage area 902 and is within the sparse coverage region 1202. Location 3 is located outside RAN-H and within the RAN-V of WSP-V. FIG. 12B shows a plot of signal strength of signals reaching the UE as the UE travels along the path. Horizontal axis 1212 represents distance along the path. Points 1, 2, and 3 along horizontal axis 1212 correspond to the locations 1, 2, and 3 in FIG. 12A. Dashed curve 1214 represents the signal strength of voice and data services provided by WSP-V along the path. Solid curve 1216 represents the signal strength of voice and data services provided by WSP-H along the path. Curve 1216 reveals how voice and data services weaken as the UE approaches the edge 1218 of the coverage area 902. Negatively sloped portion 1218 of the signal strength curve 1216 corresponds to the sparce region 1202. However, because conventional roaming onto RAN-V cannot begin until the UE has reached the edge 1220 of RAN-H (i.e., signal strength is at or about zero), the UE experiences weak and intermittent voice and data services even though signal strength of WSP-V represented by signal strength curve 1214 could be used to maintain continuous voice and data services to the UE.

Typical RAN components are monolithic or closed units (i.e., all-in-one solutions) that implement each layer of the cellular protocol stack. Protocol stacks are a layered collection of protocols that work together to provide communication services. Each protocol in the stack executes a specific task. For example, the cellular protocol stack functions comprise medium access control ("MAC"), radio link control ("RLC"), data packet convergence protocol ("DPCP"), and radio resource control ("RRC"). Because typical RANs of different WSPs are monolithic closed off units, voice and data services are not handed off to a visited network until the subscribers are no longer within the coverage area of their home network. As a result, subscribers often experience weak and intermittent voice and data service near the edges of their home network. Weak and intermittent voice and data services near the edges of a home network drains home network resources because voice calls that are dropped near the edge are often restarted and intermittent data transmissions must be repeated to fill in data lost because of weak or intermittent signals.

Methods and systems described herein are directed to intelligent roaming which has the advantage of switching a UE from a home network onto a visited network before the signal of the home network reaches zero to avoid lost voice and data services due to weak or intermittent signals near the edge of the home network. Methods and systems are implemented in an open RAN ("O-RAN") of the home network and an O-RAN of the visited network. Open RAN deployments are based on disaggregated, virtualized, and software-based components, connected through open and standardized interfaces, and interpolated across different WSPs. Disaggregation and virtualization have the advantage of enabling flexible deployments, based on cloud-native principles. Open RAN increases the resiliency and reconfigurability of the RAN. Open and standardized interfaces allow WSPs to onboard different equipment, which opens RANs to smaller WSPs who do not own a physical telecom network. Methods and systems described herein create interfaces that link O-RANs of different WSPs.

Figure 13:
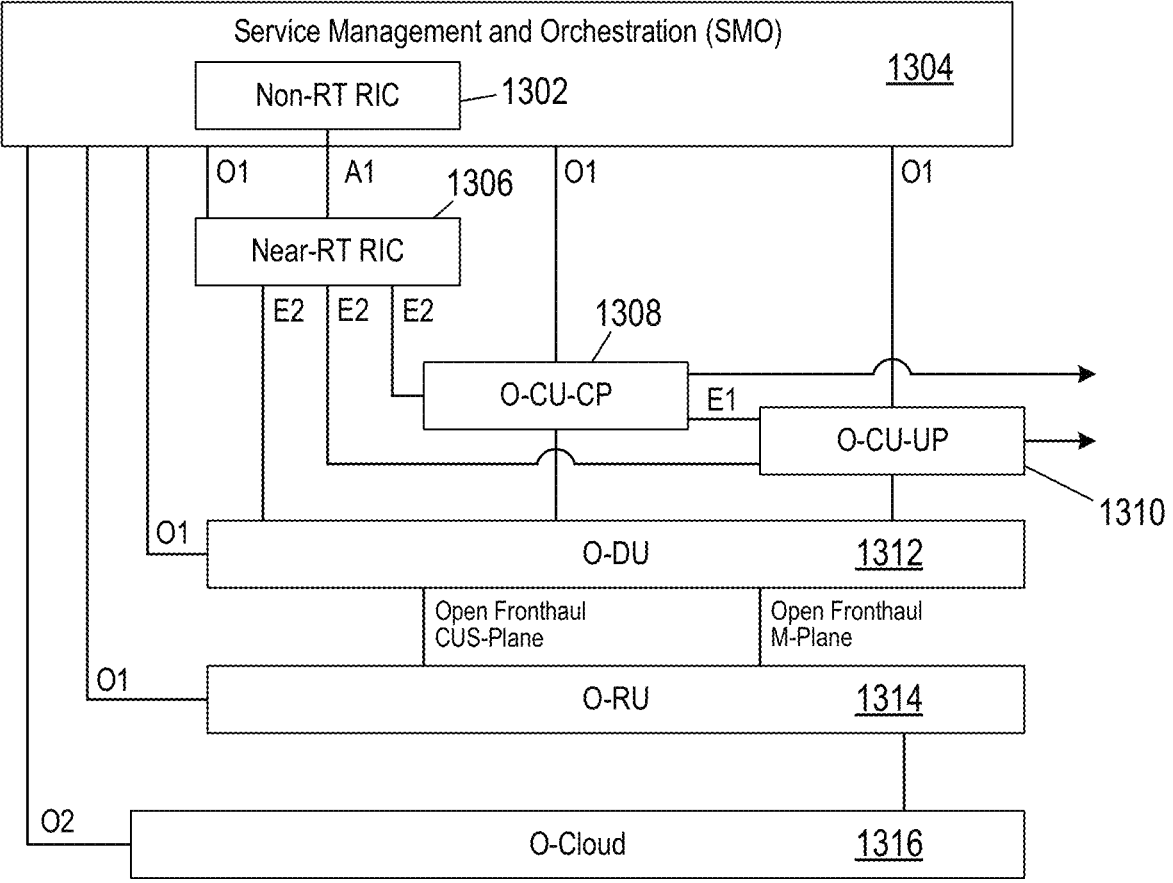
FIG. 13 shows an example open RAN ("O-RAN") architecture.

FIG. 13 shows an example O-RAN architecture. The O-RAN architecture addresses traditional RAN challenges by creating a disaggregated and virtualized network with standard interfaces, thereby enabling open, virtualized, and fully interoperable RANs. The O-RAN architecture includes RAN intelligent controllers ("RICs"), which are software defined components that control and optimize RAN functions. The O-RAN architecture includes a non-real-time RIC ("non-RT RIC") 1302 as a component of a service management and orchestration framework ("SMO") 1304 and a near-real-time RIC ("near-RT RIC") 1306. The non-RT RIC 1302 provides guidance, enrichment information, and management of machine learning ("ML") models for the near-RT RIC. Additionally, the non-RT RIC 1302 indirectly controls certain SMO operations, which enables the non-RT RIC 1302 to indirectly control all the components of the O-RAN architecture connected to the SMO, including making decisions and applying policies that influence thousands of devices. The non-RT RIC 1302 enables closed-loop control of the RAN with timescales larger than about 1 second. The non-RT RIC 1302 supports the execution of third-party applications, denoted by rApps, which are used to provide value added services to support and facilitate RAN optimization and operations, including executing policies, enrichment information, configuration management and data analytics. The near-RT RIC 1306 is deployed at the edge of the network and executes control loops with a periodicity between about 10 millisecond and about 1 second. As shown in FIG. 13, the near-RT RIC 1306 interacts with the O-DU and the O-CU in the RAN. The near-RT RIC 1306 is usually associated with multiple RAN nodes. As a result, the near-RT closed-loop control can affect the QoS of hundreds or thousands of UE subscribers. The near-RT RIC 1306 consists of multiple applications supporting custom logic, called xApps, and of the services that are required to support the execution of the xApps. An xApp is a microservice that can be used to perform radio resource management through standardized interfaces and service models. An xApp receives data from the RAN (e.g., user or cell) and, if necessary, computes and sends back control actions. To support xApps, the near-RT RIC 1306 includes a database that contains information on the RAN (e.g., list of connected RAN nodes and users) and serving as a shared data layer among xApps; messaging infrastructure across the different components of the platform, also supporting the subscription of RAN elements to xApps; terminations for open interfaces and Application Programming Interfaces ("APIs"), and conflict resolution mechanisms to orchestrate control of the same RAN function by multiple xApps.

In FIG. 13, the example O-RAN architecture includes a central unit ("O-CU"), a distributed unit ("O-DU") 1312, and a radio unit ("O-RU") 1314. The O-CU is split into two logical components: central unit control plane ("O-CU-CP") 1308 and a central unit user plane ("O-CU-UP"). This logical split allows different functionalities to be deployed in VMs or containers at different locations of the network, as well as on different hardware platforms. The O-CU-CP, O-CU-UP, and the O-DU can be virtualized on servers at the edge (with hardware acceleration for some of the physical layer functionalities). In particular, the different RAN functions executed by the O-CU-CP, O-CU-UP, and the O-DU can be implemented as separate microservices, not as one monolithic virtual machine (VM). For example, the O-CU-CP, O-CU-UP, and the O-DU can be executed in separate VMs as described above with reference to FIG. 4A or executed in separate containers as described above with reference to FIG. 4B. The O-RU 1314 is implemented on field programmable gate arrays ("FPGAs") and application-specific integrated circuit boards ("ASICs") deployed close to cell site antennas. Components of the O-RAN architecture shown in FIG. 13 can be deployed on a hybrid cloud computing platform called O-Cloud 1316, which is a set of computing resources and virtualization infrastructure that are pooled together in one or multiple physical datacenters.

In FIG. 13, the O-RAN architecture includes internal interfaces denoted by A1, E1, E2, O1, and O2. The near-RT RIC 1306 is connected to the non-RT RIC 1302 via an A1 interface that enables a non-RT control loop and deployment of policy, guidance, and intelligent models in the near-RT RIC 1306. The E2 interfaces connects the near-RT RIC 1306 to the O-CU-CP 1308 and the O-CU-UP 1310 and connects near-RT RIC 1306 to O-DU 1312. The non-RT RIC 1302 also terminates an O1 interface, which connects to every other RAN component for management and orchestration of network functionalities. The non-RT RIC 1302 and the SMO 1304 connect to O-Cloud 1316 through the O2 interface, and the O-RAN Fronthaul interface connects the O-DU 1312 and the O-RU 1314.

Figure 14A:
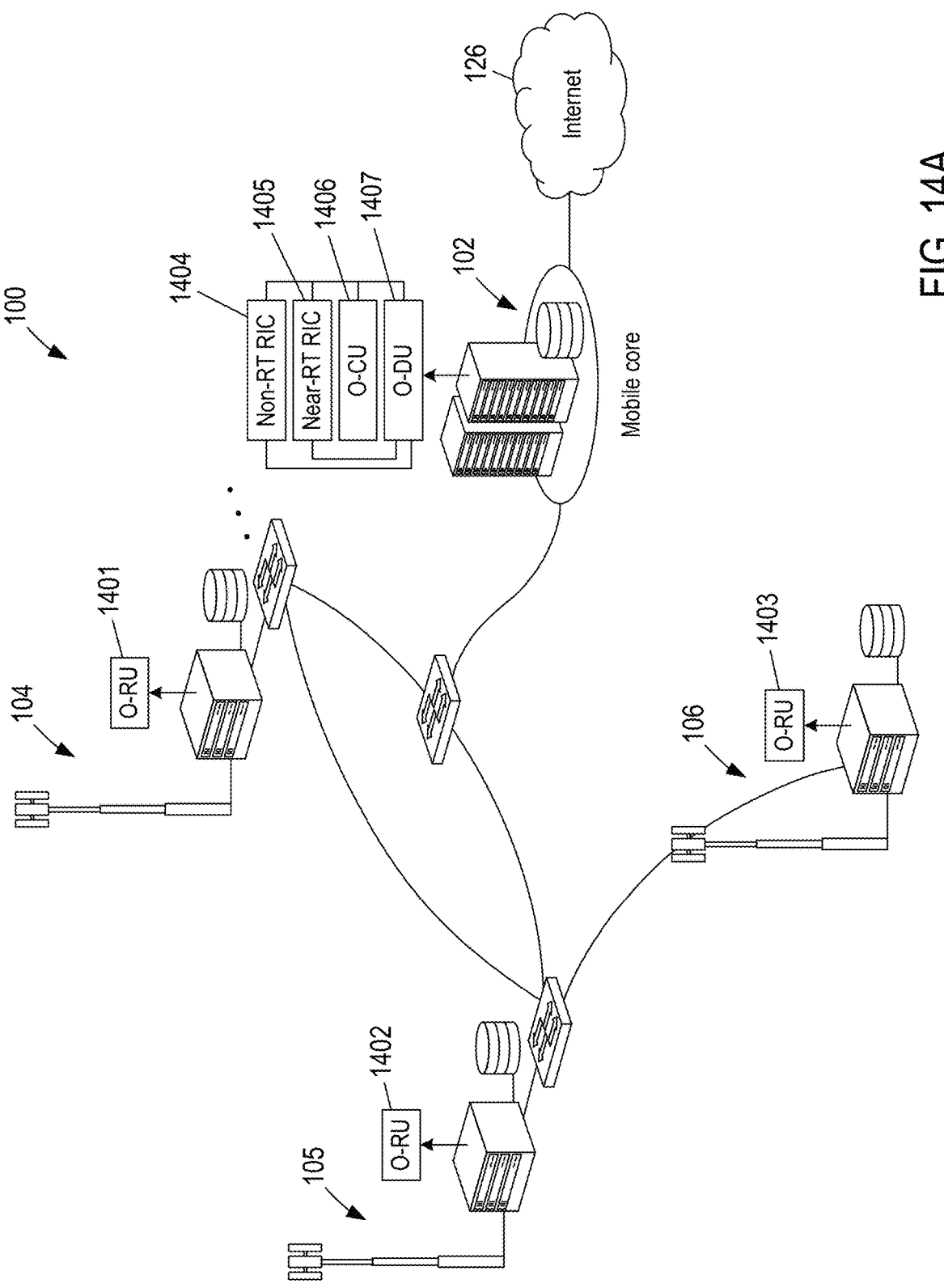
FIGS. 14A-14B show example implementations of O-RAN components in a telecom network.
Figure 14B:
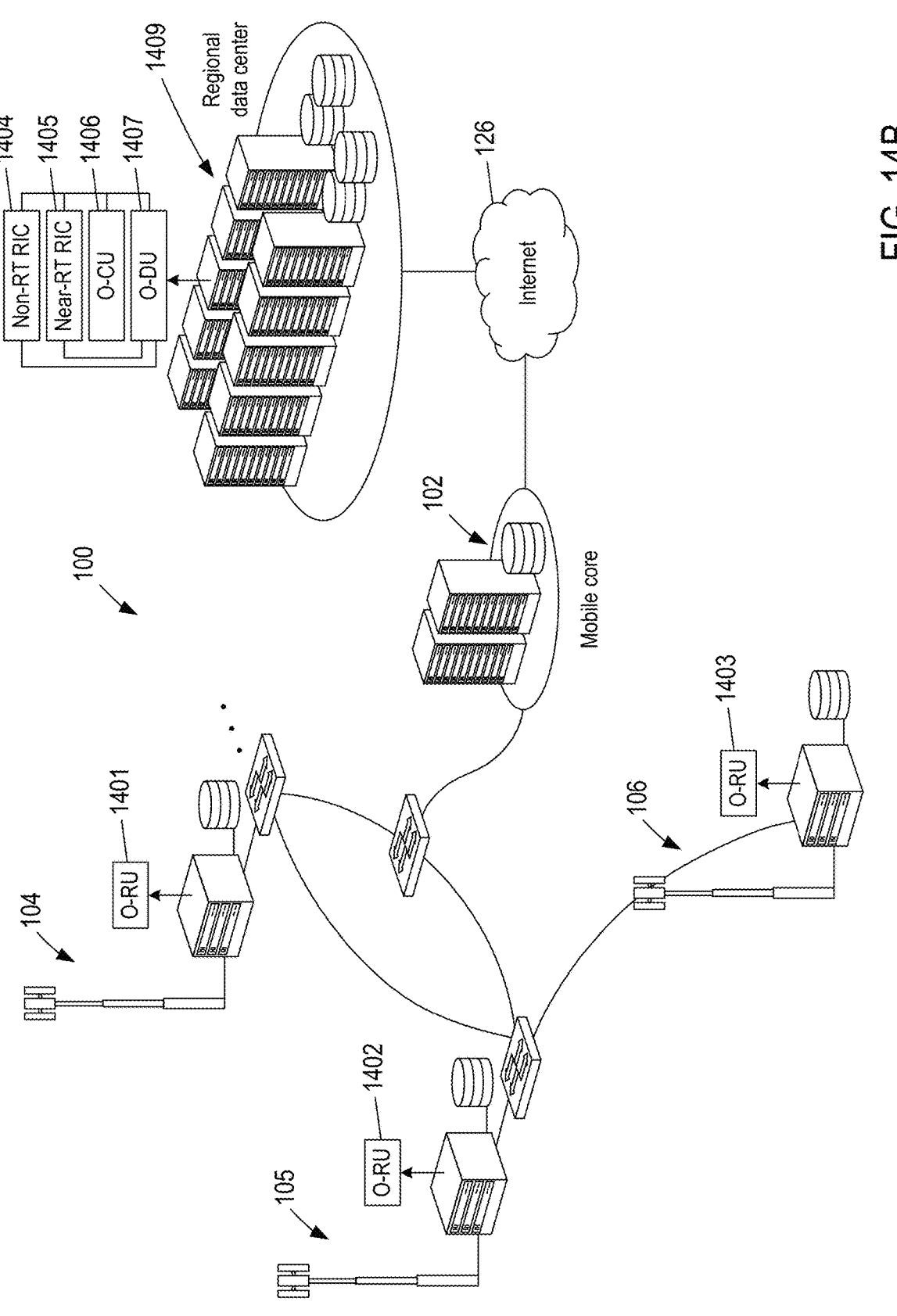

FIGS. 14A-14B show example implementations of O-RANs in the telecom network 100. In FIG. 14A, O-RUs 1401-1403 of a first O-RAN are deployed at the cell sites 104-106 of the telecom network. The non-RT RIC 1404, near-RT RIC 1405, O-CU 1406, and O-DU 1407 of the first O-RAN are deployed in the mobile core 102. In FIG. 14B, O-RUs 1401-1403 of a second O-RAN are deployed at the cell sites 104-106 of the telecom network 100. The non-RT RIC 1404, near-RT RIC 1405, O-CU 1406, and O-DU 1407 of the second O-RAN are deployed in a regional data center 1409.

In another implementation, the non-RT RIC 1404 can be located with the O-CU 1406 and the O-DU 1407 in the mobile core 120 and the near-RT RIC 1405 can e located in the cell sites 104-106. In another implementation, the non-RT RIC 1404 can be located with the O-CU 1406 and the O-DU 1407 in the regional data center 1409 and the near-RT RIC 1405 can be located in the cell sites 104-106 or located in the mobile core 102.

Figure 15:
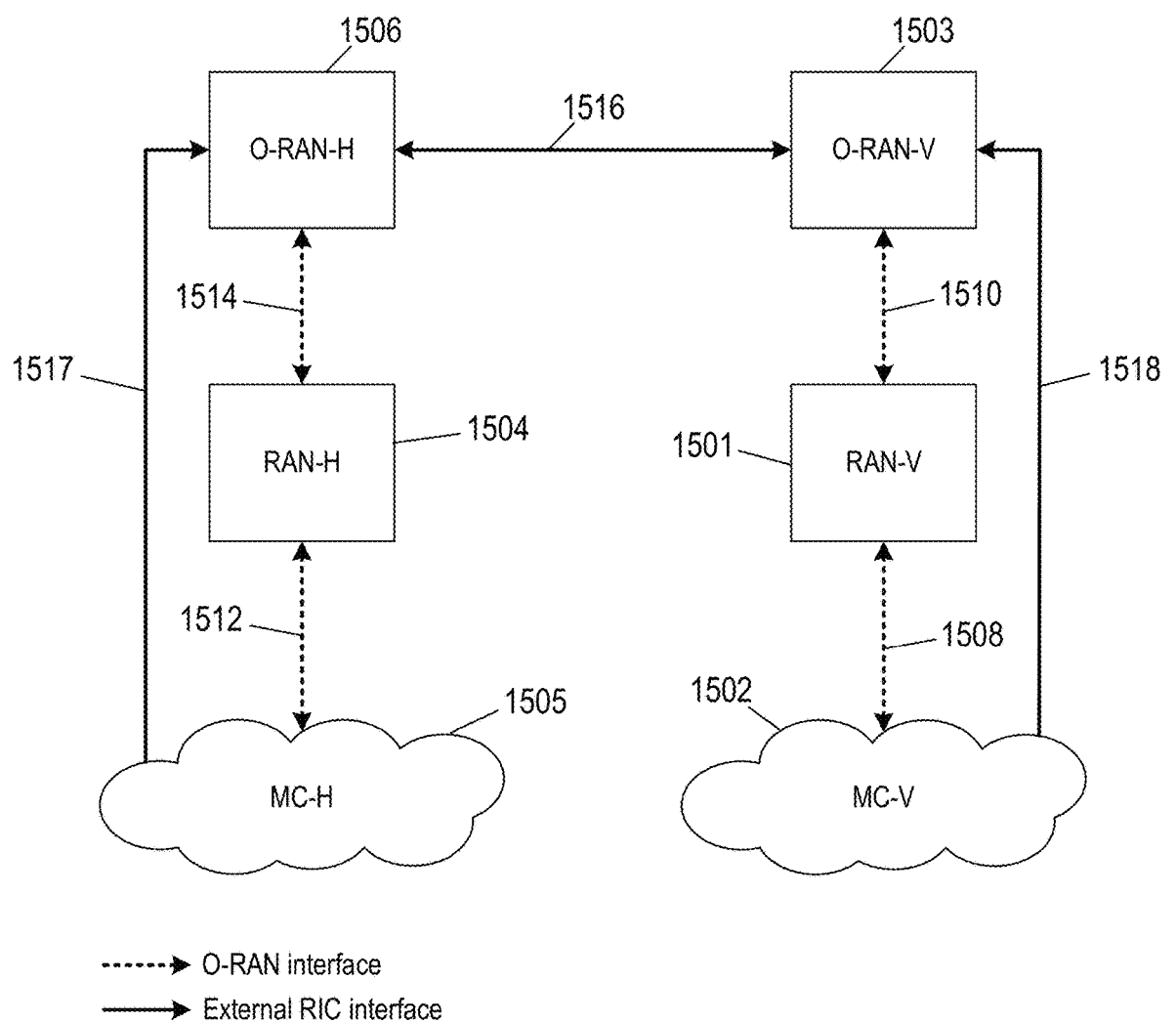
FIG. 15 shows example interfaces that connect an O-RAN of a home network with an O-RAN of a visited network.

FIG. 15 shows example O-RANs of wireless service providers WSP-V and WSP-H described above. In FIG. 15, block 1501 represents RAN-V and cloud 1502 represents a mobile core, denoted by MC-V, of a telecom network maintained by WSP-V described above with reference to FIG. 8. Block 1503 represents an O-RAN, denoted by O-RAN-V. of WSP-V. Block 1504 represents RAN-H and cloud 1505 represents a mobile core, denoted by MC-H, of a telecom network maintained by WSP-H described above with reference to FIG. 9. Block 1506 represents an O-RAN, denoted by O-RAN-H, of WSP-H. Dashed directional arrows 1508 and 1510 represent O-RAN interfaces between the O-RAN-V, RAN-V and MC-V described above with reference to FIG. 13. Dashed directional arrows 1512 and 1514 represent the O-RAN interfaces between the O-RAN-H, RAN-H and MC-H described above with reference to FIG. 13. Directional arrow 1516 represents external RIC interfaces that enable the RICs of O-RAN-V to communicate with RICs of O-RAN-H. Directional arrow 1517 represents external RIC interfaces that enable the RICs of O-RAN-H to communicate with a home network data analytics function ("NWDAF-H") of the MC-H and is referred to as the NWDAF-H interface. Directional arrow 1518 represents external RIC interfaces that enable the RICs of O-RAN-V to communicate with a visited network data analytics function ("NWDAF-V") of the MC-V and is referred to as the NWDAF-V interface.

Figure 16:
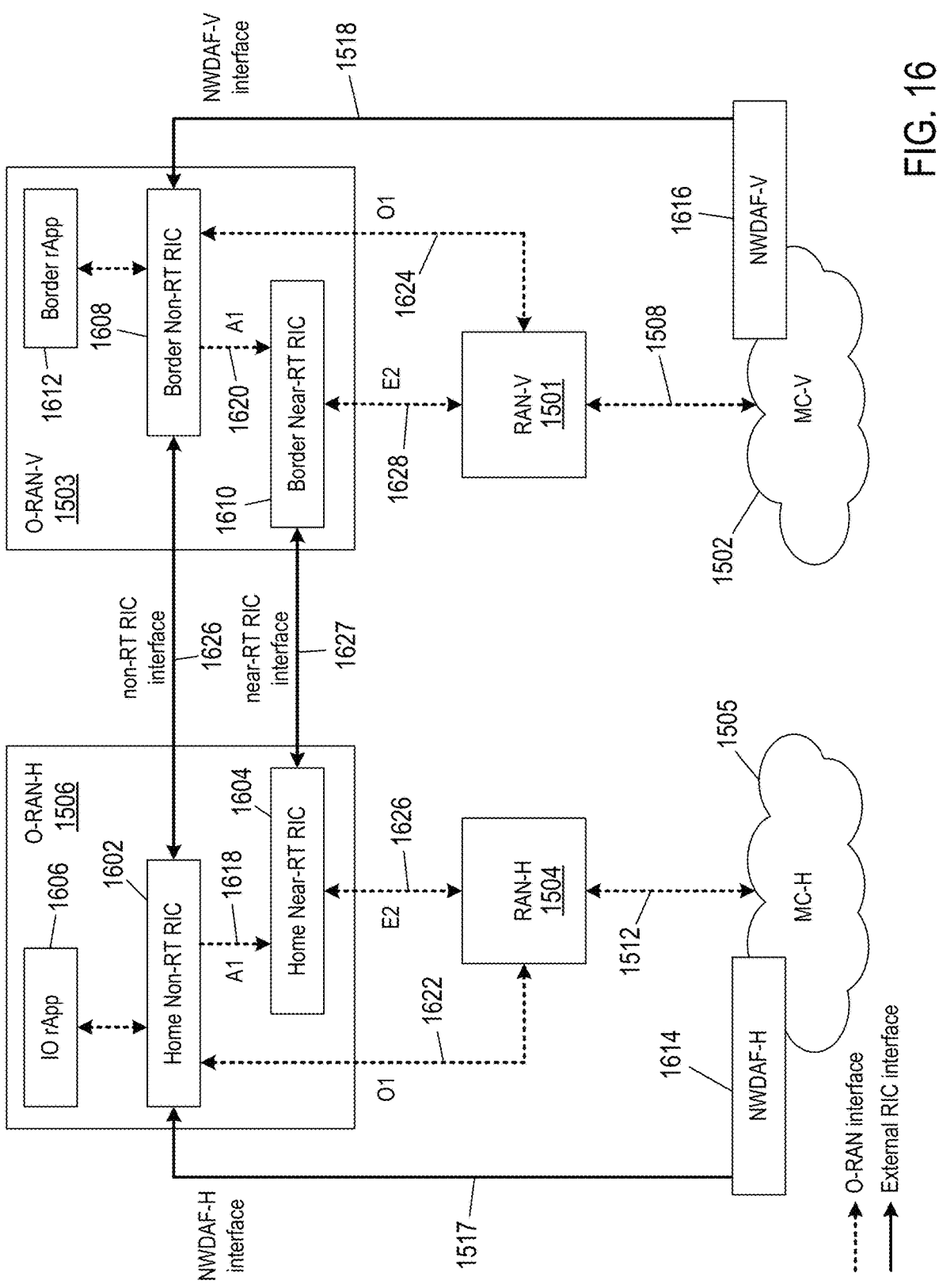
FIG. 16 shows example interfaces that connect RAN intelligent controllers ("RICs") of an O-RAN of a home network with RICs of an O-RAN of a visited network.

FIG. 16 shows external RIC interfaces that interconnect the RICs of the O-RANs of the home and visited networks and connect the O-RANs to mobile cores of the home and visited networks. In FIG. 16, block 1602 represents the non-RT RIC of the O-RAN-H 1506 and is denoted by "home non-RT RIC." Block 1604 represents the near-RT RIC of the O-RAN-H 1506 and is denoted by "home near-RT RIC." Block 1606 represents an intelligent offloading ("IO") rApp. The IO rApp 1606 and the home non-RT RIC 1602 enable intelligent offloading from edge cell sites of the home network to the visited network. Intelligent offloading is executed for UEs in idle mode using the non-RT RIC 1602 or in connected mode using the near-RT RIC 1605. Idle mode occurs when a UE is turned on but is not in use, such as when a UE is turn on but is not being used for a voice call or data transmission. In idle mode IO, the non-RT RIC 1602 monitors performance of UEs in the edge cell sites of RAN-H over the O1 interface 1622 and determines whether to adjust the edge cell site configuration over the O1 interface 1622. The non-RT RIC 1602 pushes idle mode UEs in edge cell sites into roaming mode when the edge cell site is congested or voice and data performance in the edge cell site is poor due to weak RF signal strength. Connected mode occurs when a UE is turned on and is currently used in a voice call or data transmission. In connected mode, the non-RT RIC 1602 sends guidelines over the A1 interface 1618 to the near-RT RIC 1604 on a coverage adjustment. The near-RT RIC 1604 selects connected UEs of the edge cell sites for pushing onto the visited network over the E2 interface 1626 based on performance monitoring or weak signal strength. When the RF signal condition of an edge cell site is not acceptable (e.g., below signal strength threshold or repeated interruptions) the near-RT RIC 1604 pushes UEs in connected mode onto the visited network by sending commands to the UEs over the E2 interface 1626 of the RAN-H.

Block 1608 represents the non-RT RIC of the O-RAN-V 1503 and is denoted by "border non-RT RIC." Block 1610 represents the near-RT RIC of the O-RAN-V 1503 and is denoted by "border near-RT RIC." Block 1612 represents a border rApp that protects the visited network against excessive offloading of UEs from the home network. The border rApp 1612 interfaces with the home network RICs 1602 and 1604 via the border RICs 1608 and 1610 to provide network loading, congestion, and performance information of border cell sites in the visited network in accordance with the roaming agreement. With network loading, congestion, and performance information of border cell sites of the visited network, the home RICs 1602 and 1604 determine which idle and connected UEs to offload onto the visited network. For example, if the border rApp reports the border cell sites of the visited network are congested, the home RICs 1602 and 1604 do not push UEs onto the visited network.

The home network includes the NWDAF-H 1614 that resides in the MC-H 1505. The visited network includes the NWDAF-V 1616 that resides in the MC-V 1502. The NWDAF-H 1614 collects data from UEs of the home network, home network functions, and operations, administration, and maintenance ("OAM") systems of the home network, such as from MC-H 1505, the cloud, and edge networks. The NWDAF-V 1616 collects data from UEs of the visited network, visited network functions, and OAM systems of the visited network, such as from MC-V 1502, the cloud, and edge networks. The NWDAF-H 1614 and the NWDAF-V 1616 use the collected data to construct and maintain corresponding machine learning ("ML") models. NWDAFs 1614 and 1616 serve as intelligence/analytics engines on the UEs of the corresponding home and visited networks as well as access network performance based on data collected from core network components of the corresponding home and visited networks. The NWDAF-H 1614 and NWDAF-V 1616 perform the following services for the corresponding home and visited networks: slice load level related network data analysis, observed service experience related network data analytics, network function load analytics, network performance analytics, UE related analytics, user data congestion analytics, and QoS sustainability analytics.

In FIG. 16, dashed directional arrows correspond to interfaces within the O-RAN architectures of the home and visited networks as described above with reference to FIG. 13. For example, A1 interfaces 1618 and 1620 correspond to the A1 interface in the O-RAN architecture of FIG. 13. The O1 interfaces 1622 and 1624 correspond to the O1 interfaces in the O-RAN architecture of FIG. 13. The E2 interfaces 1626 and 1628 correspond to the E2 interfaces in the O-RAN architecture of FIG. 13. Directional arrows 1626, 1627, 1517, and 1518 represent external RIC interfaces. External RIC interface 1626 connects the home non-RT RIC 1602 to the border non-RT RIC 1608 and is called a "non-RT RIC interface." External RIC interface 1627 connects the home near-RT RIC 1604 to the border near-RT RIC 1610 and is called a "near-RT RIC interface." External RIC interface 1517 connects the home non-RT RIC 1602 to the NWDAF-H 1614 and is called a "NWDAF-H interface." External RIC interface 1518 connects the border non-RT RIC 1608 to the NWDAF-V 1616 and is called a "NWDAF-V interface."

The home non-RT RIC 1602 and the home near-RT RIC 1604 are deployed in edge cell sites of the home network where UEs of WSP-H subscribers experience weak signal strength or sparse coverage, such as sparce coverage regions near edges of the WSP-H described above with reference to FIGS. 12A-12B. In one implementation, the O-RAN-H 1506 performs intelligent offloading of UEs of WSP-H subscribers in edge cells sites of the home network by pushing UEs to roam on the visited network while the signal of the home network is still present. Unlike conventional roaming where roaming does not occur until the UEs are outside of the home network and the signal of the home network has dropped zero, with intelligent offloading performed by the O-RAN-H 1506, UEs experiencing weak signal strength in the edge cell sites of the home network are pushed to roam on a visited network. The O-RAN-H 1506 performs intelligent offloading of UEs from the home network to a visited network where the UEs is in idle mode or in connected mode. Idle mode (i.e., idle state) occurs when the UE has not registered with a network (e.g., turned on but sleeping) or is switched off. Idle mode may allow applications to execute in the background and respond to certain signals, such as signals indicating a text message. A UE in connected mode is registered with a network and is switched on. In connected mode, one or more applications executing on the UE may be actively sending signals and receiving signals from the telecom network the UE is registered on.

In a first implementation, intelligent roaming offload of UEs of WSP-H subscribers onto the visited network is performed by the non-RT RIC 1602 or the near-RT RIC 1604 of the O-RAN-H 1506 in the home network. The first implementation can be executed according to one of the following two scenarios:

In a first scenario, the non-RT RIC 1602 monitors the performance of UEs of WSP-H subscribers in the edge cell sites of the home network over the O1 interface 1622. The non-RT RIC 1602 adjusts the edge cell site configuration over the O1 interface 1622 by pushing UEs of WSP-H subscribers that are in idle mode into roaming mode when the home network is congested. Alternatively, or in addition to, the non-RT RIC 1602 adjusts the edge cell site configuration over the O1 interface 1622 by pushing UEs of WSP-H subscribers connected to the edge cell sites into roaming mode when the measured RF signal strength is than a signal-strength threshold.

In a second scenario, the non-RT RIC 1602 can also send guidelines over the A1 interface 1618 to the near-RT RIC 1604 on the coverage adjustment of WSP-H subscribers. The near-RT RIC 1604 can select WSP-H subscribers in the edge cell sites in a connected state based on performance monitoring over the E2 interface 1626 and send commands over E2 interface 1626 to push UEs in the sparce coverage regions of edge cell sites of the home network onto the visiting network when the measured RF signal strength is less than a signal strength threshold.

In the first implementation, the decision to push UEs of the home network onto the visited network is performed without any information regarding to state of the visited network. As a result, attempts to offload the UEs to the visited network according to either the first scenario or the second scenario of the first implementation may be denied service in the visited network because the home network has not collected information in advance about congestion or signal strength in the visited network.

In a second implementation, the border RICs 1608 and 1610 send network loading and performance information and an offloading policy over the interfaces 1626 and 1627 to the corresponding RICs 1602 and 1604 in edge cell sites of the home network in accordance with the roaming agreement between the WSP-H and the WSP-V. The objective of the offloading policy is to protect the visiting network against excessive offloading of UEs from the home network, which could create congestion for WSP-V subscribers. With network loading and performance information and the off-loading policy provided by the border RICs 1608 and 1610, the home RICs 1602 and 1604 can make intelligent decisions regarding which idle-mode and connected-mode UEs should be offloaded to the visited network or if the visited network is too congested to accept any UEs for offloading. For example, the border RICs 1608 and 1610 may send a performance expectation value to the RICs 1602 and 1604, where the performance expectation value represents the degree of congestion at the border cell sites of the visited network. A performance expectation value of zero is an indication that the border cell sites are congested and cannot accept any roaming of offloaded UEs from the home network. The border RICs 1602 and 1604 may have also sent an offloading policy to the RICs 1602 and 1604 that states the visited network will not accept offloading of UEs when the performance expectation value is less than a performance threshold. In this example, the RICs 1602 and 1604 compare the performance expectation value zero with the performance threshold of the policy and determine that none of the UEs can be offloaded at this time. Alternatively, if the border RICs 1608 and 1610 send a performance expectation value greater than the performance threshold to the RICs 1602 and 1604, the RICs 1602 and 1604 determine which of the idle-mode and connected-mode UEs on the home network will benefit from being pushed into roaming mode on the visited network. The RICs 1602 and 1604 then send a signal that instructs the selected UEs to switch into roaming mode on the visited network.

Figure 17:
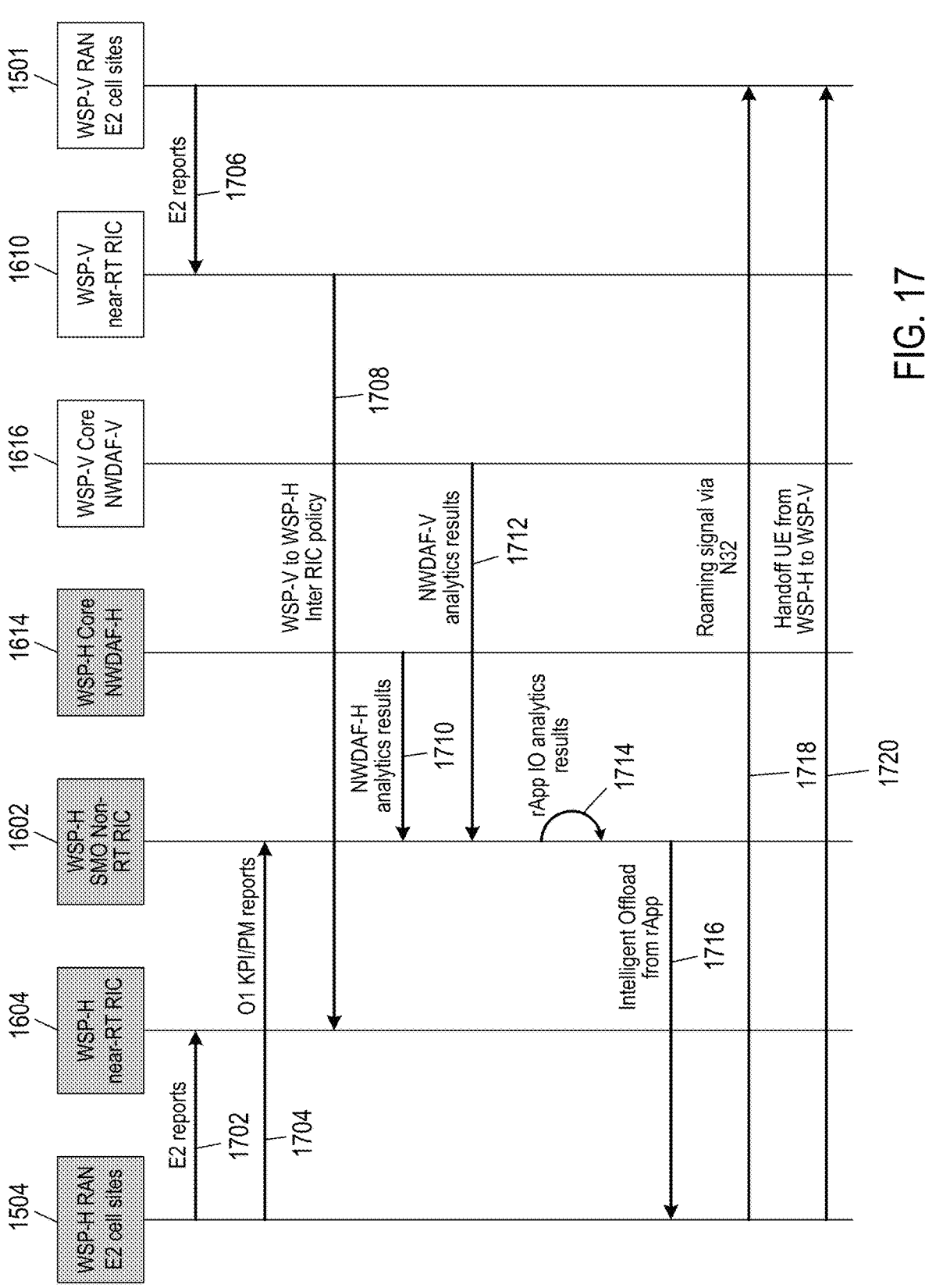
FIG. 17 shows an example sequence diagram of intelligent roaming using a near real time ("near-RT") RIC of a home network and a near-RT RIC of a visited network for data exchange.

FIG. 17 shows an example sequence diagram of intelligent roaming using the near-RT RIC of the home network and the near-RT RIC of the visited network for data exchange. Shaded blocks 1504, 1602, 1604, and 1614 represent components of the WSP-H. Unshaded blocks 1501, 1610, and 1616 represent components of the WSP-V. Cell sites of the WSP-H RAN 1504 collect and record performance information of UEs located in edge cell sites of the home network. The edge cell sites create an edge performance report for each of the UEs in the coverage areas of the edge cell sites. For example, an edge performance report may record signal strength of a UE and whether the UE is in idle mode or connected mode. Directional arrow 1702 represents the edge cell sites of the WSP-H RAN 1504 sending the performance reports to the near-RT RIC 1604 over the E2 interface 1626. The edge cell sites 1504 also create a key performance indicator ("KPI") for each of the UEs. For example, a KPI of a UE can be latency, throughput, number of times a voice call is dropped per unit time, number of times a data transmission is dropped per unit time, or the amount time needed to connect a voice call or a data transmission. The KPI can also be formulated as a combination of any two or more latency, throughput, number of times a voice call is dropped per unit time, number of times a data transmission is dropped per unit time, and the amount time needed to connect a voice call or a data transmission. The KPI reports can be part of the edge cell site performance reports. Directional arrow 1704 represents sending the KPIs and the performance reports from the edge cell sites 1504 to the non-RT RIC 1602 over the O1 interface 1622.

The border cell sites 1501 of the WSP-V RAN also collect and record performance information of UEs located in coverage areas of the border cell sites. The border cell sites 1501 create a border performance report for each of the UEs in the coverage areas of the edge cell sites and send the reports to the near-RT RIC 1610 of the visited network over the E2 interface 1628 as represented by directional arrow 1706. The near-RT RIC 1610 evaluates the border performance reports and generates an offload expectation value, indicating the degree to which the border cells sites are congested and can accept offloading of UEs from the edge cell sites of the home network. Directional arrow 1708 presents sending the visited network offloading policy, which describes conditions for offloading UEs from the home network onto the visited network, and the performance expectation value to the near-RT RIC 1604 over the near-RIC interface 1627. A border near-RT RIC 1610 interfaces the home near-RT RIC 1604 over the near-RT RIC interface 1627 to provide network loading and performance information in accordance with the roaming agreement. The objective is to protect the visiting network against excessive offloading of UEs from the home network. The IO performed by the non-RT RIC 1602 and near-RT RIC 1604 take that into account network loading and performance information in deciding whether or not to offload UEs and which idle and connected UEs to offload. The visited network offloading policy may be any combination of the following requirements: VoNR ("voice over new radio") is active, UE belongs to an address resolution protocol ("ARP"), UE with average packet delay greater than a packet delay threshold, and reference signal receiver power ("RSRP") is below an RSRP threshold. An idle or connected UE of the home network satisfying any one or more of the conditions, is offloaded to the visited network, provided the visited network can accept the UEs.

The NWDAF-H 1614 computes analytics results for UEs on the home network. The analytics results include application-level UE performance, UE mobility and/or location tracking, and performance correlation. Directional arrow 1710 represents sending the analytics results to the non-RT RIC 1602 over the NWDAF-interface 1517. The NWDAF-V 1616 computes the analytics results for UEs on the visited network. Directional arrow 1712 represents sending the analytics results to the non-RT RIC 1608 (not shown) over the NWDAF-interface 1518, which forwards the analytics results to the non-RT RIC 1602 over the non-RIC interface 1626. Directional arrow 1714 represents the rApp 1606 processing the analytics results, KPIs, and performance reports. The rApp 1606 compares the performance expectation value with the conditions of the offloading policy and determines whether any UEs in the edge cell sites can be offloaded to the border cell sites. If UEs can be offloaded, rApp determines which idle mode and connected mode UEs can be offloaded based on the analytics results, KPIs, and performance reports. For UEs that satisfy the offloading policy, the rApp pushes the UEs onto the visited network by send a signal to the edge cells sites 1504 that instructs the UEs to roam on the visited network as represented by directional arrow 1716. For example, if the signal strength of a UE on the home network is below a signal-strength threshold and there is bandwidth available in the border cell sites of the visited network as indicated by a performance expectation value greater than the performance threshold, the rApp sends a signal to the edge cell site instructing the UE to start roaming on the visited network. On the other hand, if the rApp determines that border cell sites cannot accept roaming UEs from the edge cell sites, the rApp does not send the signal that pushes the UEs to roam on the visited network. Directional arrow 1718 represents roaming signals generated by UEs that have received instructions to roam on the visited network. Directional arrow 1720 represents handing off voice and data services of the UEs to the border cell sites of the visited network. The border cells sites establish channels of communication with the roaming UEs and the edge cell sites close channels to the UEs.

This process of actively pushing UEs from the home network onto the visited network by sending the signal that instructs the selected UEs to switch into roaming mode is executed while the UEs are within the coverage areas of the edge cell sites and the carrier signal of the home network has not dropped to zero. As a result, the UEs are seamlessly transitioned from the home network to the visited network without dropping voice and data services. This seamless transition has a significant advantage over the traditional practice of only switching into roaming mode when the carrier signal of the home network drops to zero, which causes dropped voice and data services to drop before the UEs are connected to the visited network.

Figure 18:
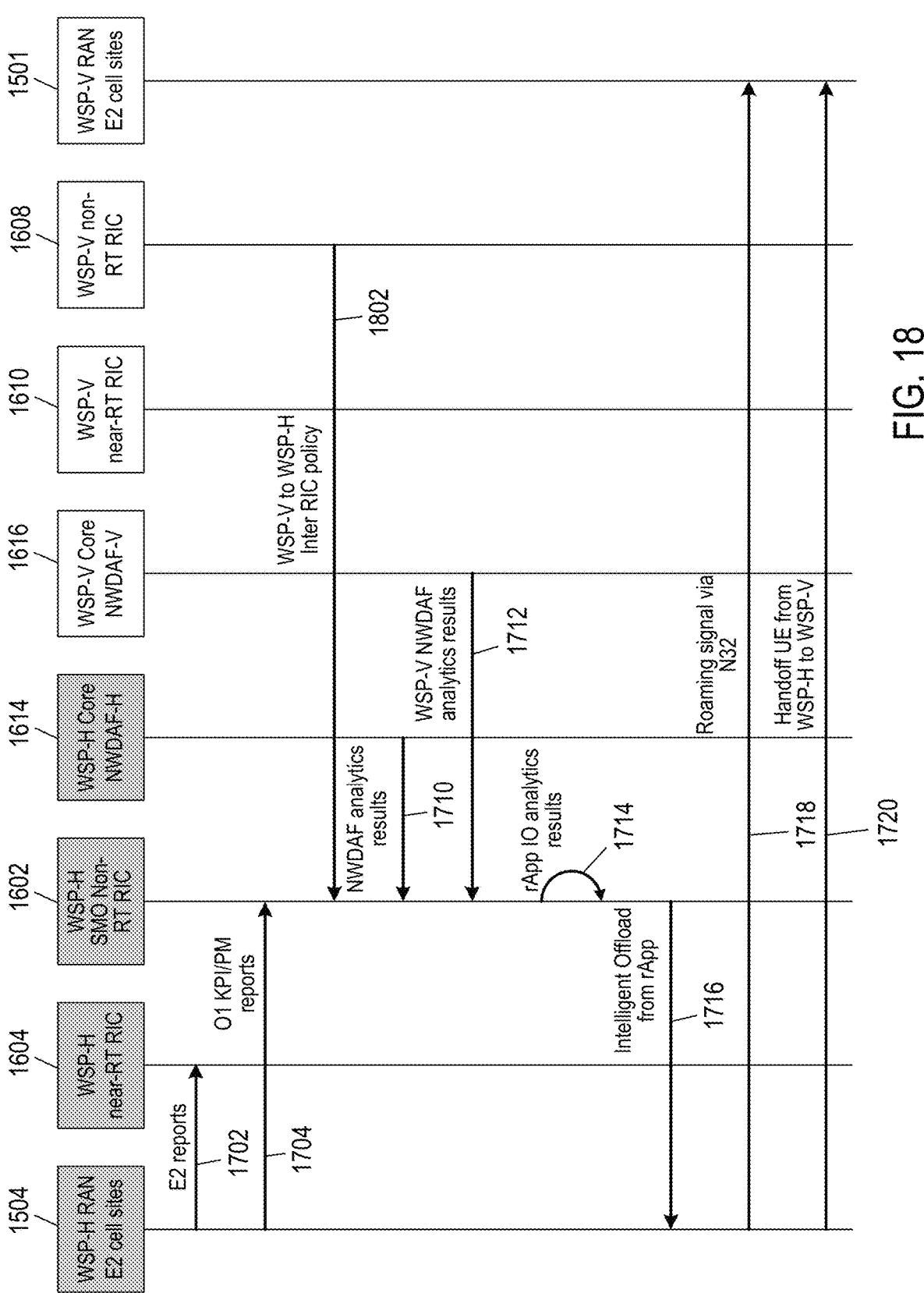
FIG. 18 shows an example sequence diagram of intelligent roaming using a non-real time ("non-RT") RIC of a home network and a non-RT RIC of a visited network for data exchange.

FIG. 18 shows an example sequence diagram of intelligent roaming using the non-RT RIC of the home network and the non-RT RIC of the visited network for data exchange. Shaded blocks 1504, 1602, 1604, and 1614 represent components of the WSP-H. Unshaded blocks 1501, 1608, 1610, and 1616 represent components of the WSP-V. The process of offloading UEs of the home network to the visited network is similar to the process of offloading UEs of the home network to the visited network as described above with reference to FIG. 17. For example, reference numbers 1702, 1704, 1710, 1712, 1714, 1716, 1718, and 1720 correspond to the operations described above with reference to FIG. 17. In this example, the border cell sites 1501 do not send performance reports to the near-RT RIC 1610 as described above with reference to FIG. 17. The non-RT RIC 1608 of the visited network sends an offloading policy to the non-RT RIC 1602 of the home network over the non-RT RIC interface 1626. The rApp compares the performance reports of UEs in the edge cell sites, KPIs, and the analytic results from the NWDAF-H and the NWDAF-V to the conditions in the offloading policy and determines whether to offload UEs. If offloading of the UEs is acceptable, the rApp determines which of the idle mode and connected mode UEs to offload to the border cell sites.

Figure 19:
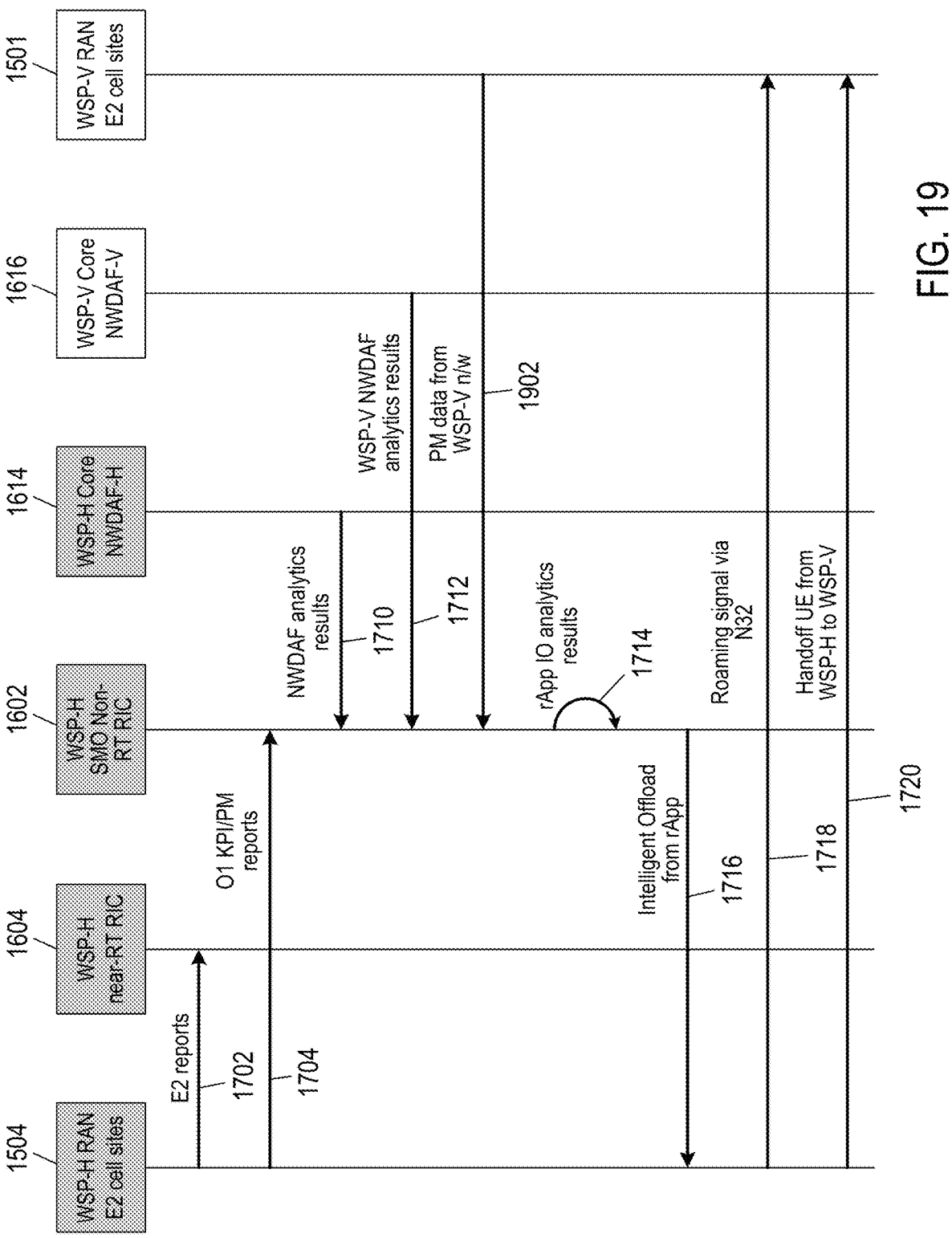
FIG. 19 shows an example sequence diagram of intelligent roaming using near-RT RIC and non-RT RIC of a home network.

FIG. 19 shows an example sequence diagram of intelligent roaming using the near-RT RIC and non-RT RIC of the home network. Shaded blocks 1504, 1602, 1604, and 1614 represent components of the WSP-H. Unshaded blocks 1501 and 1616 represent components of the WSP-V. Reference numbers 1702, 1704, 1710, 1712, 1714, 1716, 1718, and 1720 correspond to the same operations described above with reference to FIG. 17. Unlike the processes described above with reference to FIGS. 17 and 18, the non-TR RIC 1608 and the near-TR RIC 1610 of the visited network are not involved in processing performance reports from the border cell sites 1501. Directional arrow 1902 represents sending the performance reports produced by the border cell sites 1501 to the non-RT RIC 1602 of the home network. For example, the border cell sites 1501 send the performance reports to the non-RT RIC 1608 over the O1 interface 1624. The non-RT RIC 1608 forwards the performance reports to the non-RT RIC 1602 over the non-RT RIC interface 1626 without processing the reports. The process of offloading UEs of the home network to the visited network is similar to the process of offloading UEs of the home network to the visited network as described above with reference to FIG. 17. The rApp compares the performance reports provided by the edge cell sites, the performance reports provided by the border cells sites, KPIs, and the analytic results from the NWDAF-H and the NWDAF-V to the conditions in an offloading policy and determines whether to offload UEs in coverage areas of the edge cell sites. If offloading of the UEs is acceptable, the rApp determines which of the idle mode and connected mode UEs to offload to the border cell sites based on the conditions in the offloading policy.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An open radio access network ("O-RAN") of a home network that performs intelligent roaming of user equipment ("UE") of the home network to a visited network, the O-RAN comprising:
   a near-real-time radio access network intelligence controller ("near-RT RIC") that receives performance reports of each UE in coverage areas of border cell sites of the visited network from a near-RT RIC executing in the visited network;
   a non-real-time radio access network intelligence controller ("non-RT RIC") that receives performance reports of each UE in coverage areas of edge cell sites of the home network, performance reports of each UE in the coverage areas of border cell sites, home network analytic results from a home network data analytics function executing in the mobile core of the home, and visited network analytic results from a visited network data analytics function executing in the mobile core of the visited network; and
   an rApp that pushes UEs, in the coverage areas of the edge cell sites, to roam on the visited network based on the edge performance reports of the home and the visited network, the home network analytic results, and the visited network analytic results.

2. The O-RAN of claim 1 wherein the near-RT RIC receives performance reports of each UE in the coverage areas of the border cell sites of the visited network over a near-RT RIC interface that connects the near-RT RIC of the home network with the near-RT RIC of the visited network.

3. The O-RAN of claim 1 wherein the non-RT RIC receives performance reports of each UE in the coverage areas of the edge cell sites of the home network over an O1 interface that connects the non-RT RIC with a radio access network ("RAN") of the home network.

4. The O-RAN of claim 1 wherein the non-RT RIC receives the home network analytic results from the home network data analytics function over a home network data analytics function interface that connects the non-RT RIC to the mobile core of the home network.

5. The O-RAN of claim 1 wherein the near-RT RIC receives the performance reports of each UE in the coverage areas of the border cell sites of the visited network over a near-RT RIC interface that connects the near-RT RIC of the home network with the near-RT RIC of the visited network and forwards the performance reports to the non-RT RIC of the O-RAN.

6. The O-RAN of claim 1 wherein the rApp sends a signal to the edge cell sites to push the UEs within the coverage areas that are suitable for roaming to roam on the visited network.

7. An open radio access network ("O-RAN") of a home network that performs intelligent roaming of user equipment ("UE") of the home network onto a visited network, the O-RAN comprising:

a non-real-time radio access network intelligence controller ("non-RT RIC") that receives performance reports of each UE in coverage areas of edge cell sites of the home network, performance reports of each UE in coverage areas of border cell sites, home network analytic results from a home network data analytics function executing in the mobile core of the home, and visited network analytic results from a visited network data analytics function executing in the mobile core of the visited network; and an rApp that pushes UEs, in the coverage areas of the edge cell sites, to roam on the visited network based on the edge performance reports of the home and the visited network, the home network analytic results, and the visited network analytic results.

8. The O-RAN of claim 7 wherein the non-RT RIC receives performance reports of each UE in the coverage areas of the border cell sites of the visited network over a non-RT RIC interface that connects the non-RT RIC of the home network with the non-RT RIC of the visited network.

9. The O-RAN of claim 7 wherein the non-RT RIC receives performance reports of each UE in the coverage areas of the edge cell sites of the home network over an O1 interface that connects the non-RT RIC with a radio access network ("RAN") of the home network.

10. The O-RAN of claim 7 wherein the non-RT RIC receives the home network analytic results from the home network data analytics function over a home network data analytics function interface that connects the non-RT RIC to the mobile core of the home network.

11. The O-RAN of claim 7 wherein the non-RT RIC receives the performance reports of each UE in the coverage areas of the border cell sites of the visited network over a non-RT RIC interface that connects the non-RT RIC of the home network with a non-RT RIC of the visited network.

12. The O-RAN of claim 7 wherein the rApp sends a signal to the edge cell sites to push the UEs within the coverage areas that are suitable for roaming to roam on the visited network.

* * * * *